US011751721B2

(12) United States Patent
Nernberger et al.

(10) Patent No.: US 11,751,721 B2
(45) Date of Patent: Sep. 12, 2023

(54) HEAT DISTRIBUTION MEMBER AND VENTS FOR TOASTER OVEN

(71) Applicant: Spectrum Brands, Inc., Middleton, WI (US)

(72) Inventors: Kroy Everett Nernberger, Madison, WI (US); Jacob Daniel Smith, Monona, WI (US); Matthew James Hamilton, McFarland, WI (US)

(73) Assignee: Spectrum Brands, Inc., Middleton, WI (US)

( * ) Notice: Subject to any disclaimer, the term of this patent is extended or adjusted under 35 U.S.C. 154(b) by 269 days.

(21) Appl. No.: 17/062,827

(22) Filed: Oct. 5, 2020

(65) Prior Publication Data

US 2021/0015300 A1     Jan. 21, 2021

Related U.S. Application Data

(62) Division of application No. 15/694,294, filed on Sep. 1, 2017, now Pat. No. 10,791,872.
(Continued)

(51) Int. Cl.
   *A47J 37/06*        (2006.01)
   *F24C 7/04*         (2021.01)
(Continued)

(52) U.S. Cl.
   CPC ....... *A47J 37/0635* (2013.01); *A47J 37/0629* (2013.01); *F24C 15/16* (2013.01);
(Continued)

(58) Field of Classification Search
None
See application file for complete search history.

(56) References Cited

U.S. PATENT DOCUMENTS 3,499,431 A * 3/1970 McArthur, Jr. ..... F24C 15/2007
                                                  126/21 R
3,693,538 A     9/1972 Synder
(Continued)

FOREIGN PATENT DOCUMENTS

EP        1598598 A1    11/2005
JP      2001074249 A    3/2001
(Continued)

OTHER PUBLICATIONS

International Search Report for co-pending PCT/US2017/049918, 6 pages, dated Jan. 15, 2018.

*Primary Examiner* — Joseph M. Pelham
(74) *Attorney, Agent, or Firm* — Kagan Binder, PLLC

(57) ABSTRACT

A heating appliance includes a housing defining a food product compartment having at least a front door and a rear wall opposite the front door. The heating appliance also includes a rack configured to support a food product within the food product compartment. The heating appliance also includes a heating assembly disposed within the food product compartment and an elongate heating device having a first length, and an angled heat distribution member having a second length disposed between the heating device and the rack. The heat distribution member includes a pattern of apertures and the heat distribution member is configured to prevent infrared radiation produced by the heating device from directly reaching the rear wall of the housing, except for infrared radiation that passes through the apertures of the heat distribution member.

9 Claims, 22 Drawing Sheets

Related U.S. Application Data

(60) Provisional application No. 62/383,089, filed on Sep. 2, 2016.

(51) Int. Cl.

| | |
|---|---|
| *F24C 15/20* | (2006.01) |
| *F24C 15/32* | (2006.01) |
| *A21B 1/14* | (2006.01) |
| *A21B 1/22* | (2006.01) |
| *F24C 15/22* | (2006.01) |
| *F24C 15/16* | (2006.01) |

(52) U.S. Cl.
CPC .............. *F24C 15/22* (2013.01); *F24C 15/32* (2013.01); *A21B 1/14* (2013.01); *A21B 1/22* (2013.01)

(56) References Cited

U.S. PATENT DOCUMENTS

| | | | |
|---|---|---|---|
| 4,761,529 A | 8/1988 | Tsisios | |
| 5,204,503 A * | 4/1993 | Maiellano, Jr. | H05B 6/766 |
| | | | 219/400 |
| 5,390,588 A * | 2/1995 | Krasznai | A47J 37/0635 |
| | | | 219/405 |
| 5,471,914 A | 12/1995 | Krasznai et al. | |
| 5,546,853 A | 8/1996 | Heil et al. | |
| 5,782,230 A | 7/1998 | Linnebur et al. | |
| 5,954,980 A | 9/1999 | Westerberg et al. | |
| 6,176,173 B1 | 1/2001 | Holbrook et al. | |
| 6,307,185 B1 * | 10/2001 | Loveless | F24C 7/10 |
| | | | 219/400 |
| 6,337,466 B1 | 1/2002 | Chasen | |
| 6,657,168 B1 | 12/2003 | Lazzer | |
| 8,820,223 B2 | 9/2014 | Lazzer | |
| 8,929,724 B1 | 1/2015 | Mograbi | |
| 9,993,110 B2 | 6/2018 | Smith et al. | |
| 11,428,418 B2 * | 8/2022 | Johnson | F24C 7/087 |
| 2006/0070615 A1 | 4/2006 | Idomoto et al. | |
| 2012/1093337 | 8/2012 | Barber et al. | |
| 2014/0021192 A1 | 1/2014 | Smith et al. | |
| 2015/0164272 A1 | 6/2015 | Holzapfel | |
| 2018/0064286 A1 * | 3/2018 | Nernberger | F24C 15/22 |
| 2018/0266697 A1 * | 9/2018 | Dash | A47J 37/0623 |
| 2019/0120505 A1 * | 4/2019 | Torrentes | F24C 15/007 |
| 2022/0007888 A1 * | 1/2022 | Starr | A47J 37/0641 |

FOREIGN PATENT DOCUMENTS

| | | |
|---|---|---|
| WO | 0135805 A1 | 5/2001 |
| WO | 2011016405 A1 | 2/2011 |
| WO | 2016126714 A1 | 8/2016 |

* cited by examiner

| STD. DEVIATION OF TOAST SHADES | |
|---|---|
| BASELINE | WITH MEMBER |
| 7.3 | 2.7 |
| 7.4 | 4.3 |
| 9.4 | 6.9 |
| 3.0 | 1.8 |
| 4.3 | 5.2 |
| 4.7 | 2.4 |
| 5.2 | 2.9 |
| 7.4 | 4.6 |
| 3.6 | 3.4 |
| 7.2 | 2.2 |
| 7.2 | 6.4 |
| 8.1 | 6.2 |
| 3.0 | 5.8 |
| 6.1 | 5.4 |
| 7.1 | 3.6 |
| AVERAGE 6.1 | 4.3 |

| % MORE EVEN | 30.0% |
|---|---|

| AIR EVENNESS TESTING | |
|---|---|
| BASELINE | WITH VENTS |
| 6.2 | 5.6 |
| 5.9 | 5.4 |
| 5.1 | 5.4 |
| 5.9 | 5 |
| 5.7 | 5.1 |
| 5.6 | 5.4 |
| 6.2 | 5.5 |
| 6.1 | 5.2 |
| 5.7 | 5.2 |
| 6 | 5.1 |
| 5.5 | 4.6 |
| 5.8 | 4.6 |
| 5.4 | 5.3 |
| 5.6 | 5.2 |
| 6.5 | 5.5 |
| 5.8 | 5.2 |

| % MORE EVEN | 10% |
|---|---|

Fig. 20

HEAT DISTRIBUTION MEMBER AND VENTS FOR TOASTER OVEN

CROSS-REFERENCE TO RELATED APPLICATIONS

This application is a divisional application of U.S. application Ser. No. 15/694,294, filed on Sep. 1, 2017, which claims the benefit under 35 U.S.C. § 119(e) of U.S. Provisional Patent Application No. 62/383,089, filed Sep. 2, 2016, the entire contents of which are incorporated herein by reference in their entireties.

BACKGROUND

Aspects of this disclosure are directed to cooking appliances, and in particular cooking appliances for heating a food product.

Many conventional heating or cooking appliances, such as toaster ovens, have one or more heating devices and a food rack mounted within a housing defining a food product compartment for heating a food product (e.g., bread or the like) placed on the rack for cooking by thermal transmission using the one or more heating devices. A front glass door (e.g., tempered glass or other heat-resistant, transparent material) often provides access to the interior of the appliance for placing the food product on the rack, and a user interface provides control over the heat emitted by the heating device(s) (e.g., control over the temperature and duration of heating). A rear wall may be located opposite the front glass door. The described heating appliances generally utilize infrared radiation and/or convection for cooking the food product, and may have one or more heating devices (e.g. including heating elements), such as heating devices used to produce heat in various applications. Examples of such heating devices include electric tubular heaters, quartz heating elements, Calrod® (a registered trademark owned by HAIER US APPLIANCE SOLUTIONS, INC.) heating elements, etc., which are generally located at or near the top and/or bottom of an insulated food product compartment or cavity for heating. A heating device can typically produce infrared radiation, convection heat, or both.

Typical box-like toaster ovens commonly face challenges relating to heating, toasting, and/or cooking evenness or uniformity due at least in part to asymmetric oven construction, where five of the six walls are made of substantially heat-reflective metal and one wall is made of a marginally heat-reflective glass door. The glass door typically allows much of the infrared radiation (heat) to pass through and escape to the surroundings, while reflective, (e.g., shiny to reflect various wavelengths of electromagnetic radiation) preferably metal surfaces of the other walls reflect much of the infrared radiation back into the food product compartment. Because of this uneven distribution of direction and reflected radiation within the oven, the food product compartment generally becomes relatively hotter towards the rear and relatively cooler towards the front, nearer to the glass door. Various related challenges with respect to convection heating evenness are also common. The food product compartment may be hotter near the middle and cooler on the lateral sides, because the area under the center of the heating devices receive more direct infrared radiation than the areas closer to the side walls of the food product compartment.

In at least some heating appliances, a shield or a heat distribution member can be situated between each heating device and a rack in order to facilitate evenly distributing heat incidence and thermal transmission over the food product. However, in existing heating appliances, the heat distribution members do not achieve the desired heating evenness.

Besides the challenges facing infrared radiation evenness, other challenges exist with regard to heat convection within the food product compartment. As known, heat convection generally involves the relative movement of gaseous-state molecules between relatively hotter and relatively cooler areas, with a tendency to equalize temperature of various points within an enclosed environment (such as an oven) over time. However, various factors, such as a persistent heat source (e.g., the heating device described above), or heat drain (e.g., the glass front door described above) can lead to an undesirable steady-state or variable distribution of convective heat during cooking.

There is a need, therefore, for a heating appliance that is configured to more evenly distribute radiant and convective thermal transmission over the food product and within the food product compartment.

SUMMARY

In one aspect, disclosed methods and structures relate to specifically-designed shields called heat distribution members near at least one heating device in a toaster oven, where the infrared radiation (or radiant heat) thermal distribution can be altered to reduce the relative amount of heat in the rear of a food product compartment and increase the relative amount of heat in the front of the food product compartment, nearer a front glass door. The heat can also be redistributed using the heat distribution members in the lateral, side-to-side dimension of the food product compartment in order to better balance the heat along the center and sides, creating more even heating and cooking along a second dimension. According to another aspect, passive vents are positioned to create a more even convective thermal distribution within an oven.

According a first aspect, a heating appliance is disclosed. The heating appliance includes a housing defining a food product compartment having at least a front door and a rear wall opposite the front door. The heating appliance also includes a rack configured to support a food product within the food product compartment. The heating appliance also includes a heating assembly disposed within the food product compartment. The heating assembly includes an elongate heating device having a first length, and an angled heat distribution member having a second length disposed between the heating device and the rack. The heat distribution member includes a pattern of apertures and the heat distribution member is configured to prevent infrared radiation produced by the heating device from directly reaching the rear wall of the housing, except for infrared radiation that passes through the apertures of the heat distribution member.

According to a variation of the first aspect, the heat distribution member includes a substantially planar vertical section and a substantially planar horizontal section. According to another variation of the first aspect, the vertical section extends vertically beyond the heating device, and the vertical section is located relatively closer to the housing in at least one dimension when compared to the distance between the heating device and the housing in the same dimension. According to another variation of the first aspect, the vertical section and the horizontal section form a substantially right angle. According to another variation of the first aspect, the second length is equal to or greater than the first length. According to another variation of the first aspect, the pattern is configured to reflect more infrared radiation produced by the heating device nearer a midpoint of the second length, where the second length is divided into three portions, including a first portion, a second middle portion, and a third portion, and the pattern of apertures reflect more infrared radiation produced by the heating device in the second middle portion than either of the first and third portions.

According to a second aspect, an elongate heat distribution member for selectively diffusing and shielding a thermal transmission of infrared radiation produced by an elongate heating device in an oven is disclosed. The elongate heat distribution member includes a first substantially planar portion and a second substantially planar portion connected to the first substantially planar portion by way of an angled portion, the second substantially planar portion forming an angle relative to the first substantially planar portion. The elongate heat distribution member also includes a plurality of apertures disposed on the first and second substantially planar portions such that the heating device creates an evenly-distributed thermal transmission to a food product within the oven. According to the aspect, at least one of the first and second substantially planar portions are configured to prevent direct thermal transmission from the heating device to a rear wall of the oven when the heat distribution member is mounted within the oven proximate the heating device, except for thermal transmission that passes through the apertures of the heat distribution member.

According to a variation of the second aspect, the angle formed by the first and second substantially planar portions is substantially a right angle. According to another variation of the second aspect, the first substantially planar portion is horizontal, and the second substantially planar portion is vertical. According to another variation of the second aspect, the plurality of apertures are also disposed on the angled portion. According to another variation of the second aspect, the elongate heating device has a length divided into three portions, including a first portion, a second middle portion, and a third portion, and the plurality of apertures reflect more infrared radiation produced by the elongate heating device in the second middle portion than either of the first and third portions.

According to a third aspect, a heating appliance is disclosed. The heating appliance includes a housing defining a food product compartment having at least a front door and a rear wall opposite the front door. The heating appliance also includes a rack configured to support a food product within the food product compartment. The heating appliance also includes a heating assembly including a heating device disposed within the food product compartment configured to heat air within the food product compartment causing the heated air to rise. The heating appliance also includes a first air vent located at a lower portion of the rear wall of the housing, the first air vent configured to permit fluid communication between the food compartment and an outside of the housing through the rear wall, and where upon the heating assembly causing the heated air to rise, additional air is received from the outside of the housing through the first air vent causing the outside air is caused to enter the food product compartment near the heating device. The heating appliance also includes a second air vent located at an upper portion of the rear wall of the housing, the second air vent configured to permit fluid communication between the food compartment and the outside of the housing through the rear wall, and where upon the heating assembly causing the heated air to rise, the air is caused to circulate until at least some of the air exits the food product compartment through the second air vent, causing a more even thermal distribution of air within the food product compartment.

According to a variation of the third aspect, the heating assembly is positioned at a height between a height of the first air vent and a height of the second air vent. According to another variation of the third aspect, the first air vent includes a first air vent array having two or more air vents, and the second air vent includes a second air vent array having two or more air vents. According to another variation of the third aspect, the rear wall includes a plurality of sections, where the sections are laid out in a three-by-three grid, the sections including an upper third, a vertical middle third, and a lower third, and a left third, a horizontal middle third, and a right third, where the first and second air vents are both located in a section defined as being within the vertical middle third and the horizontal middle third.

According to a fourth aspect, a method of heating air within an even is disclosed. The method includes generating heat using a heating device located within a food product compartment of the oven. The method also includes heating the air using the heat generated by the heating device, causing the heated air to rise within the food product compartment. The method also includes drawing in outside air at a first air vent located on a lower portion of a rear wall of a housing of the oven, the first air vent configured to permit fluid communication through the rear wall. The method also includes circulating the rising, heated air in a first circulation path until at least some of the heated air exits the oven housing through a second air vent located on an upper portion of the rear wall of the oven housing, the second air vent configured to permit fluid communication through the rear wall, causing a more even thermal distribution of air within the food product compartment.

According to a variation of the fourth aspect, the method further includes defining the food product compartment of oven with a front door located opposite the rear wall. According to another variation of the fourth aspect, the circulating causes the first circulation path to be generally closer to the rear wall than the front door. According to another variation of the fourth aspect, the circulating further causes the heated air to circulate in a second circulation path that is generally closer to the front door than the rear wall. According to another variation of the fourth aspect, the heat generated by the heating device is convective heat.

These and various other features and advantages will be apparent from a reading of the following detailed description.

BRIEF DESCRIPTION OF THE DRAWINGS

FIG. 13 is a data table including shade data for a baseline toaster oven to a toaster oven utilizing the heat distribution member, as described herein.

FIG. 20 is a data table including air temp evenness for an oven equipped with upper and lower vents, as described herein.

Corresponding reference characters indicate corresponding parts throughout the several views of the drawings.

DETAILED DESCRIPTION

Figure 1:
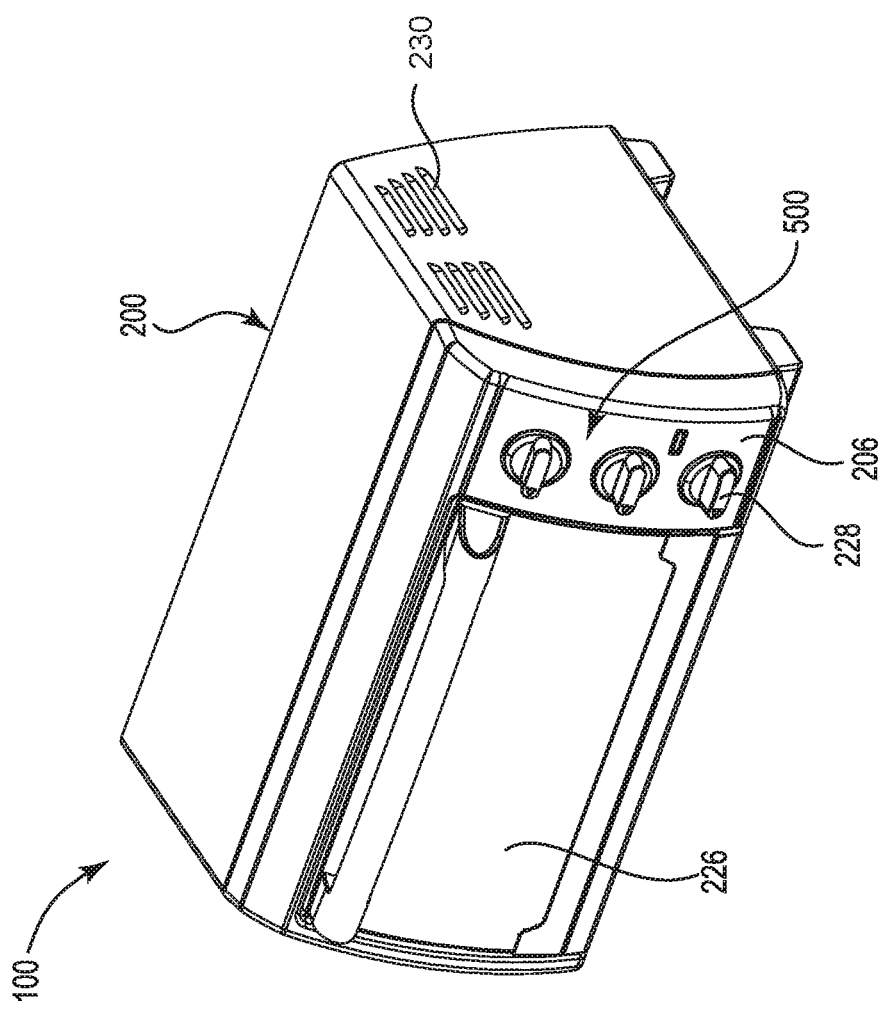
FIG. 1 is a perspective view of one embodiment of a heating appliance, according to various embodiments.
Figure 2:
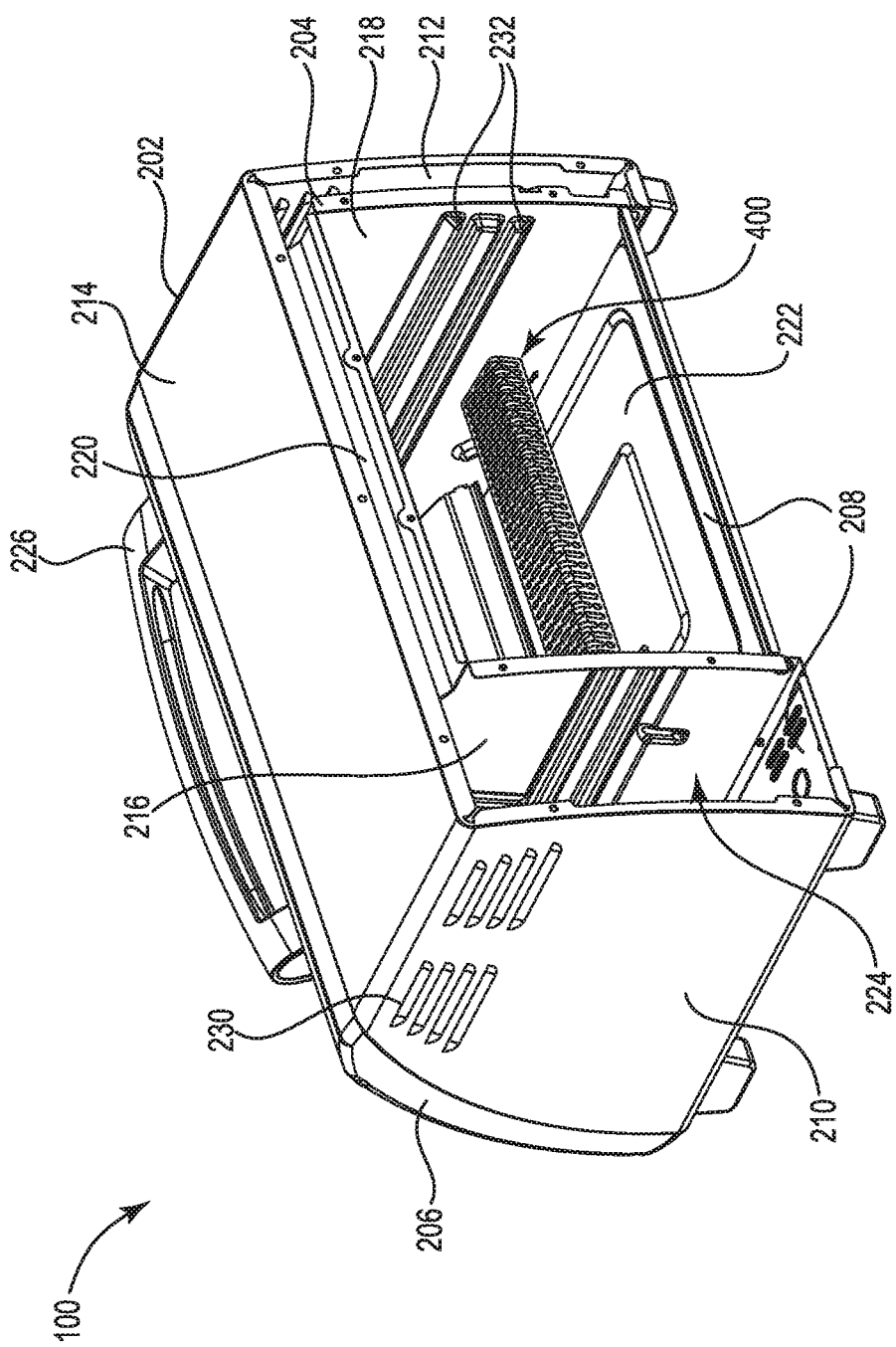
FIG. 2 is a rear perspective view of the heating appliance of FIG. 1 with a rear panel omitted to show interior components, according to various embodiments.
Figure 3:
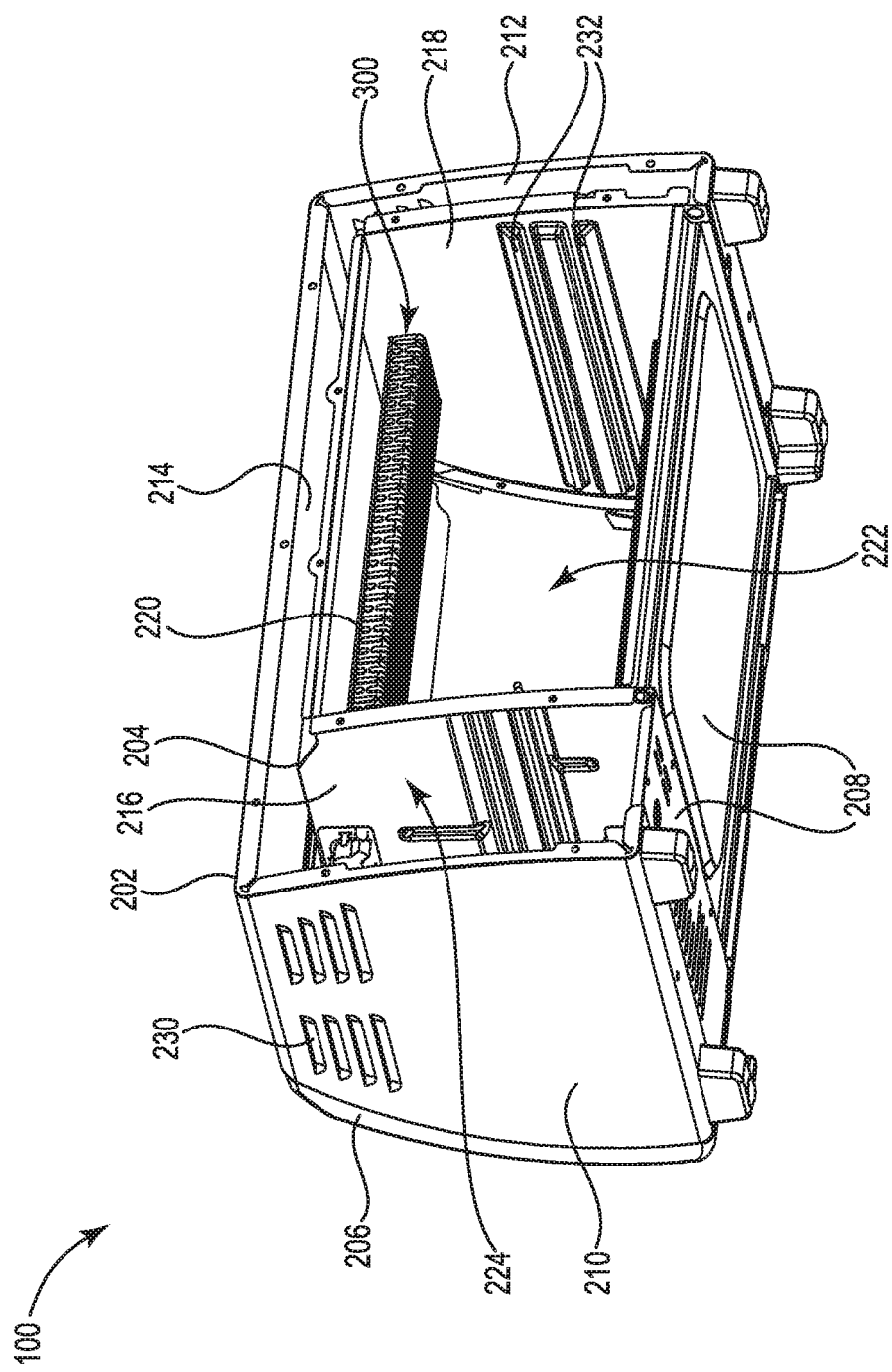
FIG. 3 is a different rear perspective view of the heating appliance of FIG. 1 with the rear panel omitted, according to various embodiments.
Figure 4:
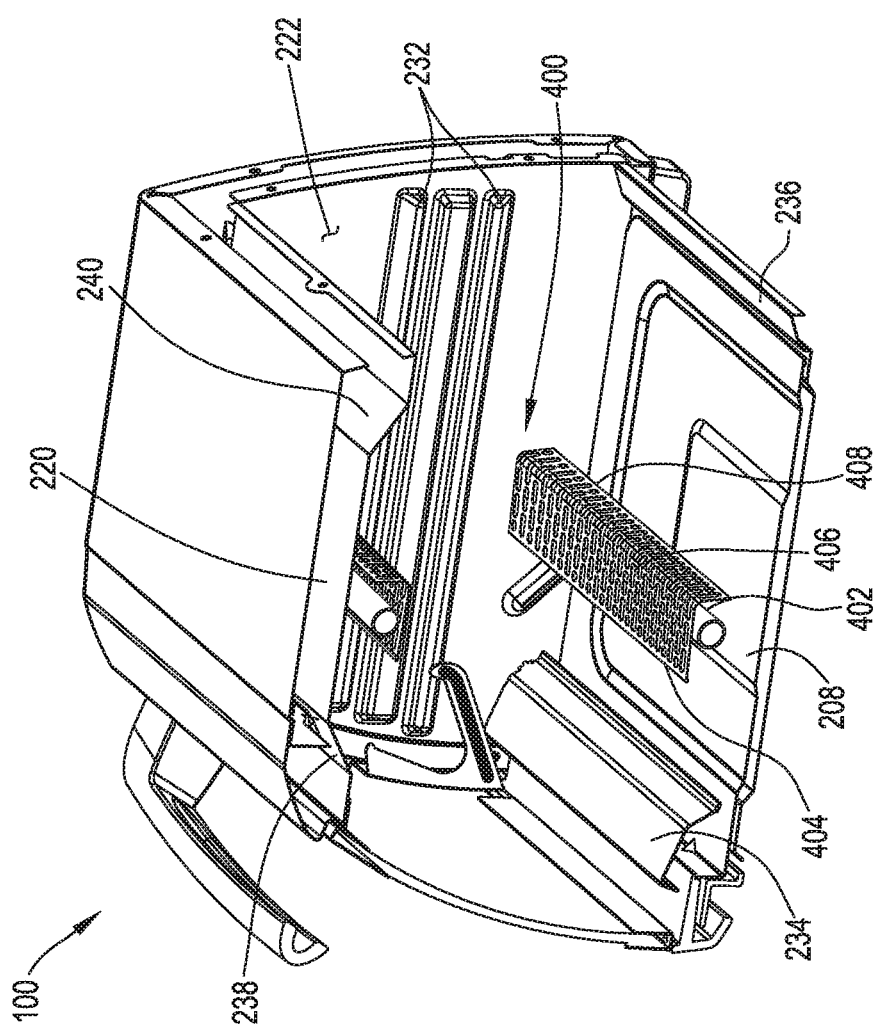
FIG. 4 is a vertical cross-section of the heating appliance of FIG. 1 with the rear panel omitted, according to various embodiments.
Figure 5:
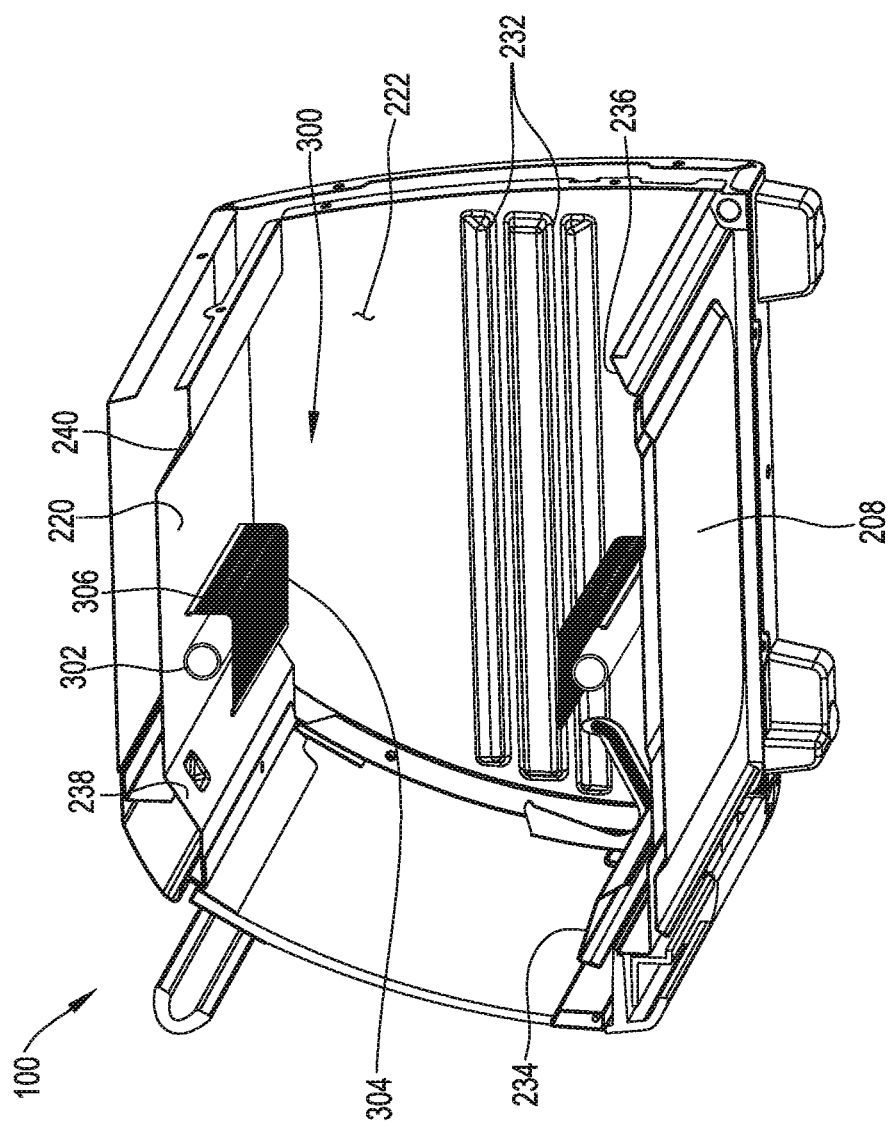
FIG. 5 is different view of the vertical cross-section of FIG. 4, according to various embodiments.

Disclosed are structures and methods relating to cooking appliances for heating a food product. As used herein, terms that describe temperatures such as "cool," "cooler," "warm," "warmer," "hot," and "hotter" are used as relative terms, where "cool" is intended to denote a lower temperature than "warm," and "cooler" is also intended to denote a lower temperature than "hotter." The relative temperatures may include wide ranges, narrow ranges, or any temperatures, provided the relativity of described thermal characteristics is preserved. The terms "warm," "hot," and other variations thereof may be used interchangeably, herein.

Aspects of this disclosure are directed to cooking appliances, and in particular cooking appliances for heating a food product. In particular, embodiments disclosure methods and structures by which cooking and/or heating within an appliance can be made more even.

More specifically, disclosed is a heat distribution member that alters the distribution of infrared radiation in a toaster oven in order to create more even heating and cooking. The described heat distribution member is preferably elongate, made of metal, and also preferably spans approximately the length of at least one heating device (e.g., including a heating element). The heat distribution member is preferably located in the toaster oven and is positioned near the heating element to either reflect and/or block infrared radiation, or allow it to pass through the heat distribution member. The infrared radiation produced by the heating device is permitted to pass through the heat distribution member where there are apertures placed, and is substantially reflected or blocked in other areas of the heat distribution member that lack apertures. The heat distribution member preferably has an "L" shape, viewed from the side, with one face or "section" positioned roughly horizontally, between the heating device and the center of the food product compartment, and another face positioned roughly vertically, between the heating device and the rear wall of the food product compartment. The vertical and/or horizontal faces may each be substantially planar. Along the length of the heat distribution member, an aperture pattern (e.g., of holes, slots, etc.) is preferably denser (more apertures and/or less actual heat-reflective surface area) towards the ends, so that more radiant heat can pass through on the ends of the heat distribution member as compared to the center, making the heat distribution and intensity in the food product compartment more even or uniform laterally from side-to-side and from front-to-rear.

A vertical planar portion of the heat distribution member is preferably positioned such that any heat that is blocked is reflected and directed toward the front of the food product compartment (toward the front door, which typically leaks heat). This reduces heat to the rear of the food product compartment, diverting the heat to the front, making the front-to-rear heat distribution, and therefore the cooking, more even and uniform. By reflecting and re-distributing heat from the rear of the food product compartment to the front, excess heat is reduced in the rear and the heat is increased in the front, which is traditionally the cooler part of the food product compartment, as described herein.

A heat distribution member, in one aspect, has a uniform pattern from front-to-rear with a bent "L" shape when viewed from the side. A first face can be horizontal, above/below the heating device and a second face can be vertical, located between the heating device and the rear of the food product compartment. Therefore, using a heat distribution member of the present disclosure, a heating appliance can be configured to more evenly distribute heat incidence over the food product.

To further improve evenness during cooking using an example toaster oven, a passive air venting system and configuration may also be employed. The passive venting system may improve passive convection performance in the example toaster oven. Utilizing turbulent flow (based on movement of heated/warm and/or outside cool air) and other general characteristics of convection in a toaster oven, vents or louvers can be selectively employed in order to more evenly distribute hot air in a convection cooking process. One preferable location for vents includes the rear wall of the oven, but the vents may also be located on the top, sides, or any surface of an example oven. As is well-known, heat tends to rise, and therefore vents may preferably be placed at an upper end of the food product compartment to allow built-up heat to more efficiently escape and/or equalize.

Cool outside air naturally gets drawn or pulled into lower vents of the oven. When the cool air moves toward the front of the oven the cool reaches the lower heating device (if present) where the cool air heats up and pushes the air above it towards the front or the rear of the oven or food product compartment, as described herein. As shown, when the air reaches the top, it preferably is hot air. As some hot air gets pushed to the front or the rear of the oven, some of the hot air escapes out the upper vents, by taking a path of least resistance or through random motion. The remaining hot air preferably cools and gets re-circulated. By letting the cool air in, it induces a circular airflow path.

Referring now to the drawings, and in particular to FIGS. 1-7, a heating appliance 100 can be a toaster oven, according to one preferred embodiment. The illustrated heating appliance 100 includes a housing (indicated generally at 200), an upper heating assembly (indicated generally at 300 in FIG. 3), a lower heating assembly (indicated generally at 400 in FIG. 2), and a heat control system (indicated generally at 500). Various embodiments may include the upper heating assembly 300, the lower heating assembly 400, or both. Various embodiments describe an upper and/or lower heating assembly 300, 400, but where appropriate, descriptions may apply to either and/or both, if present. Various heat distribution members and other components are understood to be described throughout with respect to upper and/or lower heat distribution members, but the descriptions of either can apply to any heat distribution member, as appropriate. In some embodiments, the upper heating assembly 300 or the lower heating assembly 400 may utilize known configurations where the other respective heating assembly employs a heat distribution member and configuration, as described herein. Other heat distribution member configurations and/or vent configurations can be utilized in conjunction with the configurations described herein, according to various embodiments.

The illustrated housing 200 has an exterior frame 202 (see FIG. 2), an interior frame 204, a front panel assembly 206, a removed rear panel assembly (also referred to as a rear wall 1632, see e.g., FIGS. 17-19), and a bottom panel assembly 208. The exterior frame 202, the interior frame 204, the front panel assembly 206, the rear panel assembly, and the bottom panel assembly 208 may be fabricated using any material suitable for the various associated functions described herein.

The exterior frame 202 has a first exterior side panel 210, a second exterior side panel 212, and an exterior top panel 214. Similarly, the interior frame 204 has a first interior side panel 216, a second interior side panel 218, and an interior top panel 220. The front panel assembly 206 and the rear panel assembly are fastened to the exterior frame 202 and/or the interior frame 204 to define a pair of adjacent interior compartments (namely, a food product compartment 222 and a thermostat compartment 224). The food product compartment 222 and the thermostat compartment 224 are preferably separated by the first interior side panel 216. A food product compartment door 226 and a user interface (e.g. a plurality of adjustable knobs 228) are preferably connected to the housing 200 at the front panel assembly 206, and vents 230 are suitably defined in the housing 200 for ventilating the housing 200. Preferably the vents 230 are for ventilating the thermostat compartment 224, as opposed to upper 1616 and lower 1618 vents described, below. A thermostat (not shown) is suitably mounted within the thermostat compartment 224 and is operatively connected (e.g., via wiring) to the knobs 228 and the heating assemblies 300, 400 to facilitate enabling a user to regulate the temperature and/or duration of heating within the food product compartment 222.

With particular reference now to the food product compartment 222, the first interior side panel 216 and the second interior side panel 218 preferably define at least one channel 232 for supporting a food rack (not shown, but may be similar to rack 1628 of FIG. 16) that extends across the food product compartment 222 at an orientation that is preferably substantially parallel to the bottom panel assembly 208 of the food product compartment 222. According to various embodiments, a front lower reflector 234 and a rear lower reflector 236 are preferably disposed on opposing sides of, and may extend substantially across, the bottom panel assembly 208 of the food product compartment 222. Similarly, a front upper reflector 238 and a rear upper reflector 240 may preferably be disposed on opposing sides of, and extend substantially across, the interior top panel 220 within the food product compartment 222. The heat reflectors 234, 236, 238, 240 may preferably be fabricated from any suitable material and may be suitably formed integrally with, or separate from and connected to, the first interior side panel 216, the second interior side panel 218, the interior top panel 220, and/or the bottom panel assembly 208 within the food product compartment 222. The various heat reflectors described herein are optional, and may be omitted or integrated into various panels, walls, or doors, according to various embodiments.

The upper heating assembly 300 can extend across the food product compartment 222 above the channels 232 from the first interior side panel 216 to the second interior side panel 218 such that the upper heating assembly 300 is disposed above the rack for heating the food product compartment 222 from above a food product (e.g., bread, etc.) disposed on the rack. Similarly, the lower heating assembly 400 can preferably extend across the food product compartment 222 below the channels 232 from the first interior side panel 216 to the second interior side panel 218 such that the lower heating assembly 400 is disposed below the rack for heating (e.g., by thermal transmission) the food product compartment 222 from below the food product disposed on the rack. Alternatively, the heating assemblies 300, 400 may have any suitable location within the food product compartment 222.

Figure 9:
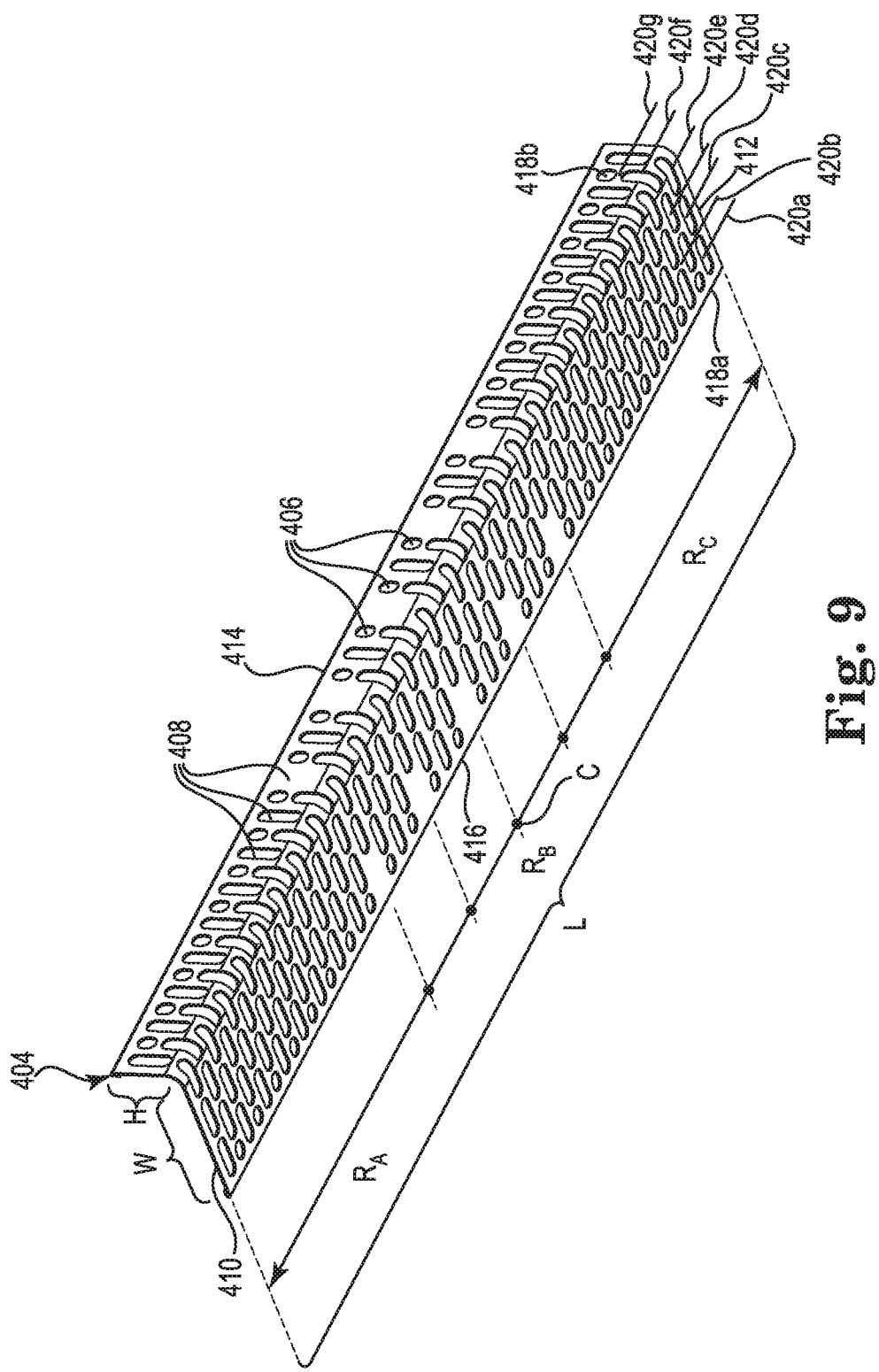
FIG. 9 is a perspective view of a lower heat distribution member of the heating appliance of FIG. 1, according to various embodiments.

The upper heating assembly 300 may preferably include a generally cylindrical (e.g., tubular) and generally linearly extending (e.g., elongate) upper heating device 302 (see, e.g., FIG. 6), along with a generally angled, L-shaped and generally linearly extending elongate upper heat distribution member 304, according to one embodiment. The upper heat distribution member 304 can preferably be spaced a distance below (or otherwise apart from) the upper heating device 302 and includes a plurality of parallel rows (e.g., seven parallel rows) of elongated apertures 306 (e.g., slots) as best illustrated in FIG. 9. The spacing between the upper heat distribution member 304 and the upper heating device 302 can be approximately equal to a multiple (e.g., 1, 2, 3, etc.) of a space separating the upper heating device 302 from the interior top panel 220, or any part of the food product compartment. Each row preferably extends along substantially the length of the upper heat distribution member 304 (i.e., substantially across the food product compartment 222 from the first interior side panel 216 to the second interior side panel 218). The upper heat distribution member 304 may preferably be configured in the same manner or different from the lower heat distribution member 404 of the lower heating assembly 400, which are both described in more detail below.

During operation of the upper heating device 302, the upper heat distribution member 304 preferably serves to reflect/shield or allow emitted heat waves or thermal transmission to pass from the upper heating device 302, thereby facilitating a more even distribution of radiant heat from the upper heating device 302 over the food product. The upper heat distribution member 304 can also serve to facilitate preventing a larger food product from contacting the upper heating device 302 within the food product compartment 222. The upper heat distribution member 304 may preferably be mounted in any suitable manner and can be fabricated using any material suitable for the functions described herein.

In various embodiment and as used herein, heat distribution member is intended to broadly refer to any structure that facilitates changing or modifying (e.g., diffracting, deflecting, and/or reflecting) the direction and/or intensity of at least some radiant energy from thermally transmitted from the heating device to the food product. In preferred embodiments, the apertures of the upper 304 and/or lower 404 heat distribution members can be arranged in a pattern so as to allow passage of radiant heat as part of a radiant energy distribution.

The lower heating assembly 400 can preferably include a generally cylindrical and generally linearly extending and elongate lower heating device 402 (see, e.g., FIG. 6), along with an L-shaped and generally linearly extending and elongate lower heat distribution member 404. The lower heat distribution member 404 is preferably spaced above the lower heating device 402 and preferably includes a plurality of apertures 406, 408 (see, e.g., FIG. 4) arranged in a pattern (i.e., a diffraction grating or other hole/slot pattern) that is described in more detail below. During operation of the lower heating device 402, the lower heat distribution member 404 preferably serves to reflect or allow heat waves emitted to pass from the lower heating device 402 to various parts within the oven, such as a food product, various walls, or the front glass door, thereby facilitating a more even distribution of heat incidence from the lower heating device 402 over the food product. The lower heat distribution member 404, if present, may preferably be mounted in any suitable manner and may be fabricated using any material suitable for the functions described herein (e.g., the lower heat distribution member 404 may preferably be fabricated from a low carbon steel coated in an aluminum-silicon alloy having about 5-11 percent silicon (e.g., a "type-1 aluminized steel" material)).

Figure 6:
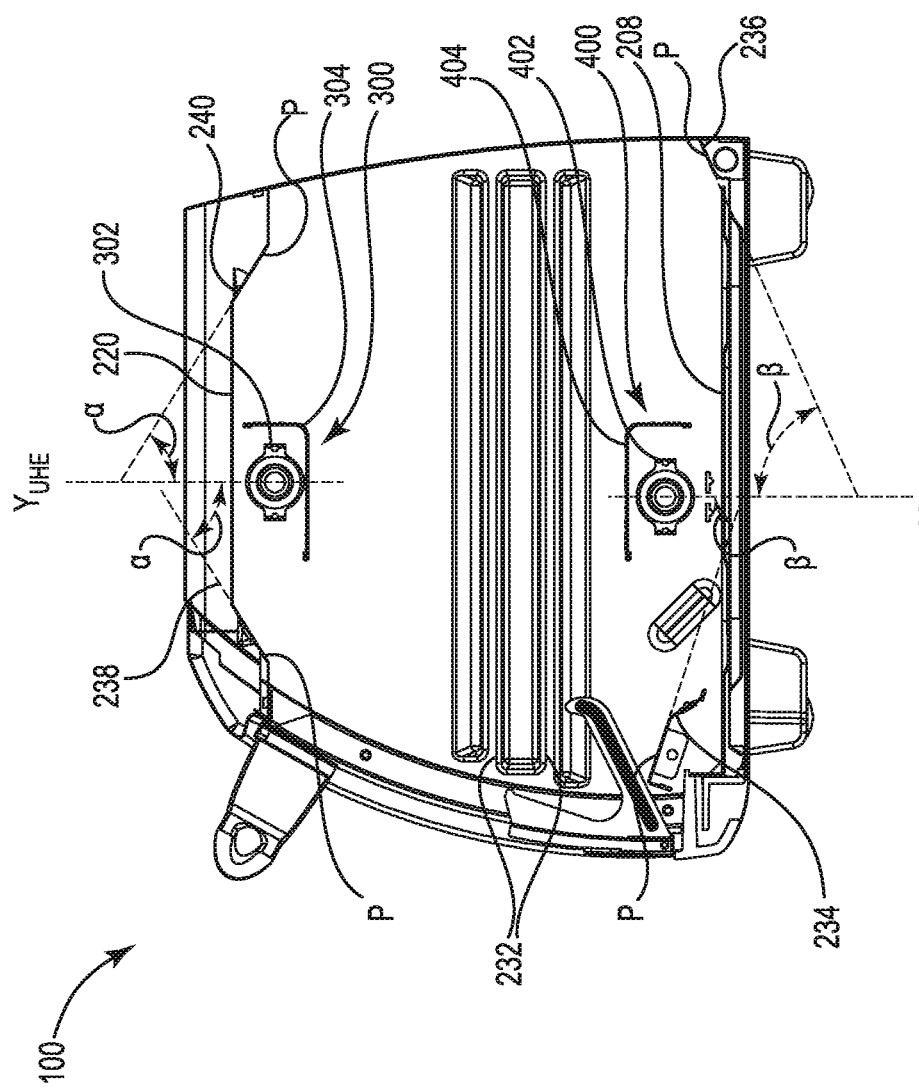
FIG. 6 is a side elevation of the cross-section of FIGS. 4 and 5, according to various embodiments.

As shown in FIG. 6, the upper heating assembly 300 and the lower heating assembly 400 may preferably be offset relative to one another (e.g., the lower heating assembly 400, if present, may be located more frontward than the upper heating assembly 300). Also, the linear profile P of each (optional) upper reflector 238, 240 may preferably be obliquely oriented at an angle α relative to a vertical axis $Y_{UHE}$ through the upper heating device 302 (e.g., at an angle α of between about 35° and about 55°). Similarly, the linear profile P of each (optional) lower reflector 234, 236 may preferably be obliquely oriented at an angle β relative to a vertical axis $Y_{LHE}$ of the lower heating device 402 (e.g., an angle β of between about 35° and about 55°). In this manner, the reflectors 234, 236, 238, 240 are preferably oriented to facilitate reflecting heat waves from the heating devices 302, 402 toward the food product disposed on the rack.

Figure 7:
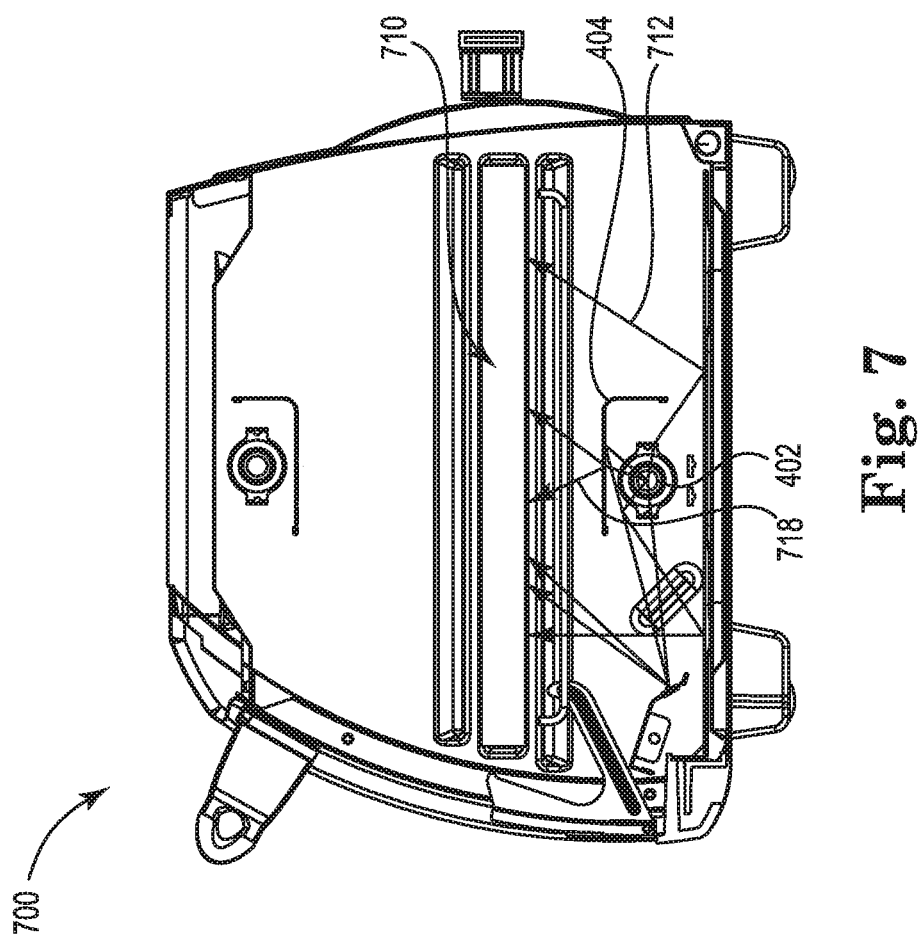
FIG. 7 is a schematic representation of radiant energy transmitted to a food product from a lower heating device of the heating appliance of FIG. 1 during operation, according to various embodiments.

As illustrated in FIG. 7, within a toaster oven 700, some reflected radiant energy 712 from the lower heating device (heater 716) 402 may preferably be reflected onto the food product via the reflectors 234, 236, 238, 240 and/or the panels 208, 216, 218, 220. According to one embodiment, some direct radiant energy 718 from the lower heating device 402 may preferably be emitted directly onto the food product 710 via the lower heat distribution member 404 (e.g., is not reflected but, rather, is deflected or diffracted onto the food product as described in more detail below). Alternatively, no radiant energy from the lower heating device 402 may be emitted directly onto the food product via the lower heat distribution member 404.

Also with respect to FIG. 7, lower heat distribution member 404 (or, likewise, upper heat distribution member 304) can preferably be configured to block, reflect and redirect, and/or diffuse infrared radiation emitted from corresponding (lower) heating device 402. According to one embodiment, the lower heat distribution member 404 is preferably angled and disposed between the lower heating device 402 (e.g., heating element) and rack (not shown), where the lower heat distribution member 404 preferably includes a pattern of apertures. As shown, the lower heat distribution member 404 may preferably be configured to prevent any infrared radiation produced by the lower heating device 402 from directly reaching the rear wall of the housing 200, except infrared radiation that passes through the pattern of apertures. According to various embodiments, various sections of the lower heat distribution member 404 are preferably configured to block infrared radiation from directly reaching a rear wall (e.g., reflective) of the toaster oven 700 from the respective heating device (e.g., including a heating element).

According to another embodiment, at least one of a first and second substantially planar portions of the lower heat distribution member 404 are preferably configured to prevent direct thermal transmission from the heating device to a rear wall of an oven, except infrared radiation that passes through the apertures of the lower heat distribution member 404. In some embodiments, the lower heat distribution member 404 includes a substantially planar vertical section and a substantially planar horizontal section. In further embodiments, the vertical section extends vertically beyond the lower heating device 402, and the vertical section is located relatively closer to the housing 200 when compared to the distance between the lower heating device 402 and the housing 200. The vertical section and the horizontal section can form a substantially right angle. See also FIG. 9 for greater detail, where the vertical section is shown having a height H, and the horizontal section is shown having a width W.

Figure 8:
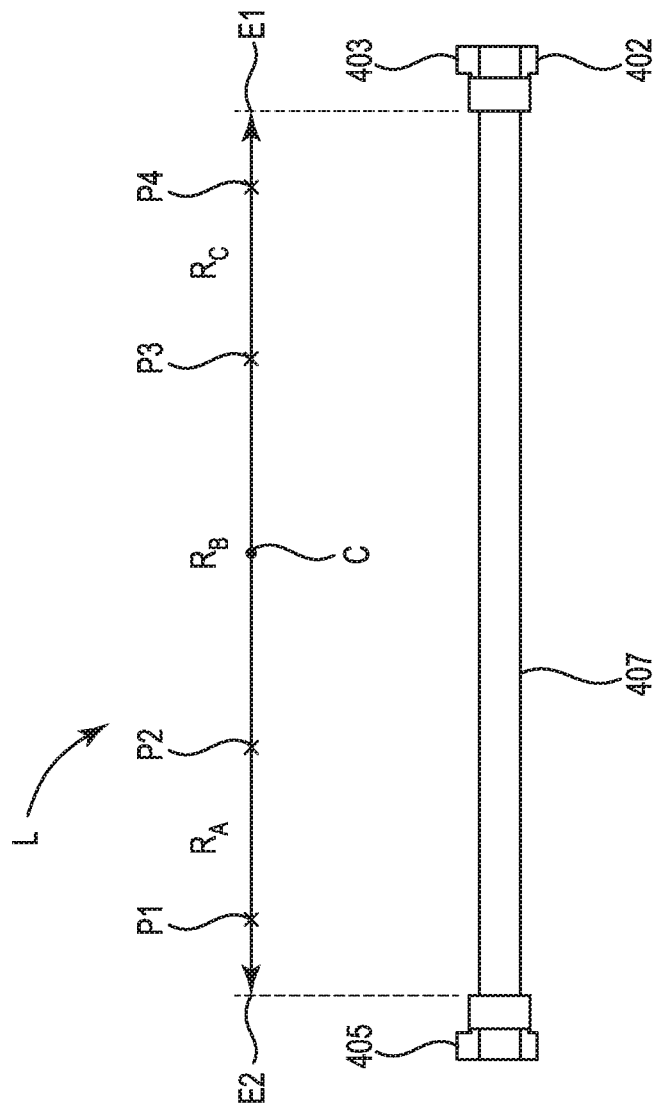
FIG. 8 is a side elevation of the lower heating device of the heating appliance of FIG. 1, according to various embodiments.

Referring now to FIG. 8, a heating device is shown in more detail, for example, the lower heating device 402. As shown, the lower heating device 402 preferably has a first support 403, a second support 405, and a heating element 407 (e.g., a quartz heating element) extending from the first support 403 to the second support 405. The supports 403, 405 are suitably configured to facilitate mounting the lower heating device 402 within the food product compartment 222. The heating element 407 has a first end $E_1$ adjacent the first support 403, a second end $E_2$ adjacent the second support 405, and a length L measured from the first end $E_1$ to the second end $E_2$. The length L has a center C.

In the illustrated embodiment, the heating element 407 preferably emits radiant energy unevenly along its length L. For example, during operation, the heating element 407 may have a first temperature (e.g., about 657.5° F. [347.5° C.]) at a first point $P_1$ along the length L, a second temperature (e.g., about 761.2° F. [405.1° C.]) at a second point $P_2$ along the length L, a third temperature (e.g., about 729.3° F. [387.4° C.]) at a third point $P_3$ along the length L, and a fourth temperature (e.g., about 624.4° F. [329.1° C.]) at a fourth point $P_4$ along the length L. The first point $P_1$ is preferably proximate the second end $E_2$, and the fourth point $P_4$ is preferably proximate the first end $E_1$. The second point $P_2$ is between the center C and the first point $P_1$, and the third point $P_3$ is between the center C and the fourth point $P_4$. A first temperature region $R_A$ (e.g., a first section) is therefore preferably defined between the first point $P_1$ and the second point $P_2$; a second temperature region $R_B$ (e.g., a second middle portion) is therefore preferably defined between the second point $P_2$ and the third point $P_3$; and a third temperature region $R_C$ (e.g., a third section) is therefore preferably defined between the third point $P_3$ and the fourth point $P_4$. In this manner, the temperature of the heating element 407 preferably decreases about 100° F. along the first region $R_A$ (i.e., from the second point $P_2$ to the first point $P_1$), and the temperature of the heating element 407 preferably decreases about 100° F. along the third temperature region $R_C$ (i.e., from the third point $P_3$ to the fourth point $P_4$). In other embodiments, the heating element 407 may have a more even or uneven temperature distribution along any suitable dimension (e.g., its length, its width, its surface area, etc.).

FIGS. 9-12 illustrate an example (lower) heat distribution member 404 and elongate heating device 402, according to one embodiment of the present invention. With reference to FIG. 9, a perspective view of a representative lower heat distribution member 404 is described in greater detail (may also apply to an upper heat distribution member 304, but only the lower heat distribution member 404 is described here in the interests of clarity and simplicity). As shown, the lower heat distribution member 404 preferably has a width W and a height H, which together form the angled, L-shape of the lower heat distribution member 404. The width W may define a horizontal section of the heat distribution member, and the height H may define a vertical section of the heat distribution member. An angled portion can join the horizontal and vertical sections.

Each of the sections may be substantially planar, as shown, or can include curves, bends, angles, waves, etc. so long as the general nature is maintained. According to various embodiments, W may be greater than H, such as two times as great, but may vary based on the dimensions of the heating device or other factors. W and H may preferably be developed or determined based upon a shape and/or configuration of oven feature in order to obtain desired goals, e.g., the ability to deflect and/or redistribute at least some infrared radiation. The lower heat distribution member 404, as shown, has a first end 410, a second end 412, and a pair of sides 414, 416 extending from the first end 410 to the second end 412. The described angled, L-shape of the lower heat distribution member 404 may take the form of a substantially right angle (90°), an acute angle, an obtuse angle, or other shape or curve, provided that the functional aspects and features of the lower heat distribution member 404 are present.

The lower heat distribution member 404, as shown, preferably includes a combination of substantially circular apertures 406 (e.g., holes) and elongated apertures 408 (e.g., slots), but may include any other form or arrangement of apertures in other embodiments. The apertures 406 are shown arranged in two parallel rows (indicated generally at 418a, 418b) and are spaced apart from one another within each respective row 418a, 418b at a substantially uniform distance from each other, according to the shown preferable embodiment. The two rows 418a, 418b preferably extend substantially along the overall length of the lower heat distribution member 404. Additionally, the apertures 406 of each row 418a, 418b are preferably substantially aligned with the apertures 406 of the same respective row 418a, 418b, as shown. The angled portion can also include a plurality of apertures disposed thereon.

The slotted apertures 408 are shown arranged in seven rows 420a, 420b, 420c, 420d, 420e, 420f, and 420g, with alternating four-row and three-row columns (columns roughly follow W and H, perpendicular to the rows described herein). The first and seventh rows (420a and 420g, respectively) are shown located along two segments of L that together compose about two thirds of the overall length L of the lower heat distribution member 404. The two segments are shown located adjacent the first end 410 and second end 412, with multiple separate groups of apertures 408 each aligned substantially near the respective ends 410, 412 and each covering about one third of the overall length of lower heat distribution member 404. In alternating rows, apertures 408 are preferably intersticed with apertures 406 at respective ends of aperture columns, with the ends near respective sides 414, 416, as shown.

Various goals of the disclosed configurations include limiting direct infrared radiation (e.g., thermal transmission) that hits food located in an oven and limiting radiation that reaches the rear of the oven by reflecting infrared radiation to where it is relatively more desired. For example, more infrared radiation may be redirected or shielded, using the lower heat distribution member 404, from regions within the oven that typically are undesirably hot (e.g., where heat dead ends) to regions within the oven that may preferably benefit from increased infrared radiation.

In alternative embodiments, the lower heat distribution member 404 may have any suitable contour (e.g., the lower heat distribution member 404 may be generally L-shaped) and the apertures 406, 408 of the lower heat distribution member 404 may be arranged in any suitable manner that facilitates enabling the lower heat distribution member 404 to function as described herein (e.g., the lower heat distribution member 404 may have any suitable number of apertures 406, 408 aligned in any suitable manner relative to one another).

During operation of the lower heating device 402 and in accordance with the above-described temperature variations along the lower heating device 402, the lower heat distribution member 404 preferably serves to more evenly distribute (e.g., deflect and/or diffract) heat waves emitted from the lower heating device 402 onto the food product, thereby preferably facilitating a more even distribution of heat incidence (e.g., thermal transmission) from the lower heating device 402 over the food product. The lower heating device (e.g., a heating element) may preferably be cylindrical and elongate, (or otherwise) and may be configured to be hottest at a midpoint of the length of the heating device, with a temperature gradient having lowest relative temperatures of two respective ends of the heating device. Alternatively, the lower heating device may have a substantially uniform heat distribution (or other heat distribution) and the lower heat distribution member 404 could still beneficially redistribute heating within the example oven.

It can be seen in at least FIGS. 9-12 that the apertures 406, 408 can preferably be arranged in a pattern that relates to (e.g., is proportional to) the gradient and variation in temperature along the length L of the lower heating device 402 (e.g., the lower heat distribution member 404 has more and/or larger apertures associated with temperature regions $R_A$ and $R_C$ than temperature region $R_B$ shown in FIG. 8), thereby reducing an uneven distribution of heat incidence over the food product that may have otherwise resulted from the temperature variation along the lower heating device 402. Aperture pattern, as shown, may be organized in rows of apertures 406, 408, according to various embodiments.

In some embodiments, the apertures 406, 408 can preferably be sized and/or located in any suitable manner that facilitates enabling the lower heat distribution member 404 to more evenly distribute direct radiant energy from the lower heating device 402 over the food product in accordance with any suitable variation in temperature along the lower heating device 402 (e.g., the apertures 406, 408 may be shaped as squares or rectangles and may be arranged curvilinearly, randomly, or otherwise, rather than being arranged in rows). It should also be noted that the material of, or manufacturing processes used to make, the lower heat distribution member 404 (or likewise the upper heat distribution member 304) may be selected to allow for greater flexibility in aperture sizes and/or patterns, thereby influencing the heat distribution effects of the lower heat distribution member 404.

Figure 10:
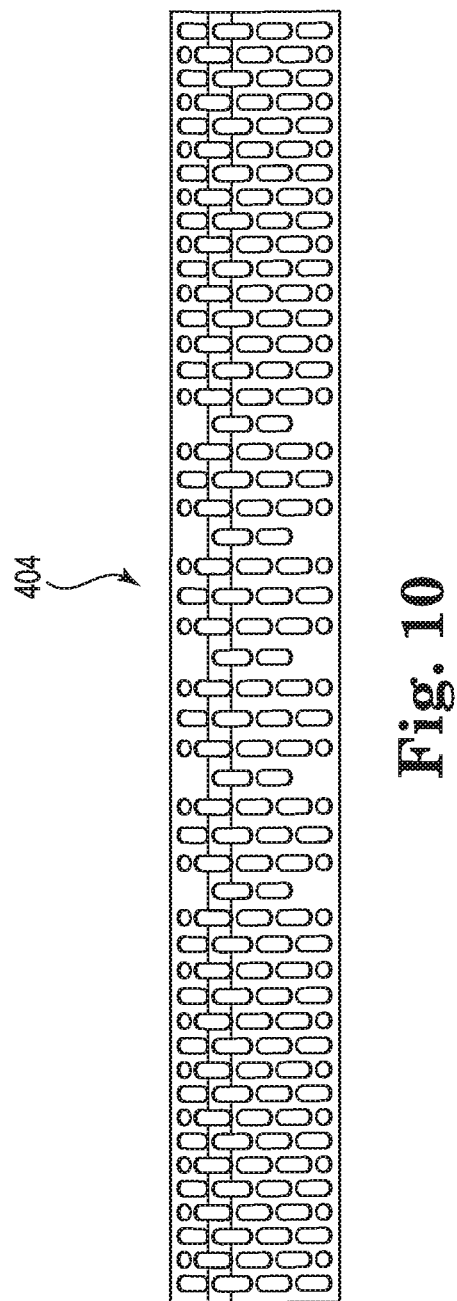
FIG. 10 is a plan view of the heat distribution member of FIG. 9, according to various embodiments.

When heating a food product within the heating appliance 100 through thermal transmission, the direct radiant energy (e.g., 718 of FIG. 7) emitted from the heating devices (302 and/or 402) is some of the higher intensity energy to contact the food product, as opposed to radiation that has been reflected, etc. (e.g., 712 of FIG. 7). Providing the above-described heat distribution members 304, 404 with apertures facilitates more even dispersing of this higher intensity, direct radiant energy from the respective heating devices 302, 402 over the food product. The reflected radiant energy (e.g., energy emitted from the heating devices 302, 402 and reflected by the reflectors 234, 236, 238, 240 and/or the panels 208, 216, 218, 220 of the food product compartment 222 onto the food product) is preferably some of the lower intensity energy to contact the food product within the heating appliance. This reflected radiant energy can be more evenly dispersed by optimizing the arrangement and/or the contours of the reflectors 234, 236, 238, 240 and/or the panels 208, 216, 218, 220 of the food product compartment 222, as described above. FIG. 10 is a plan view of the heat distribution member 404 of FIG. 9, according to various embodiments.

The various rows of apertures are shown more closely spaced on the left and ride sides of the heat distribution member 404, and spaced farther apart toward in the middle. In various embodiments, a pattern of apertures of the heat distribution member 404 can be configured to reflect more infrared radiation produced by the heating device nearer a midpoint of the length of the lower heat distribution member 404 than nearer ends of the lower heat distribution member 404. Also in some embodiments, the heat distribution member can be configured to prevent infrared radiation produced by the heating device from directly reaching the rear wall of the housing, except the infrared radiation that passes through the apertures of the heat distribution member. This configuration can be beneficial because the middle of the food product compartment is usually hotter than the left and right sides, and this aperture spacing can help to more evenly distribute infrared radiation and make the food product compartment temperature more even for the heating appliance 100.

Figure 11:
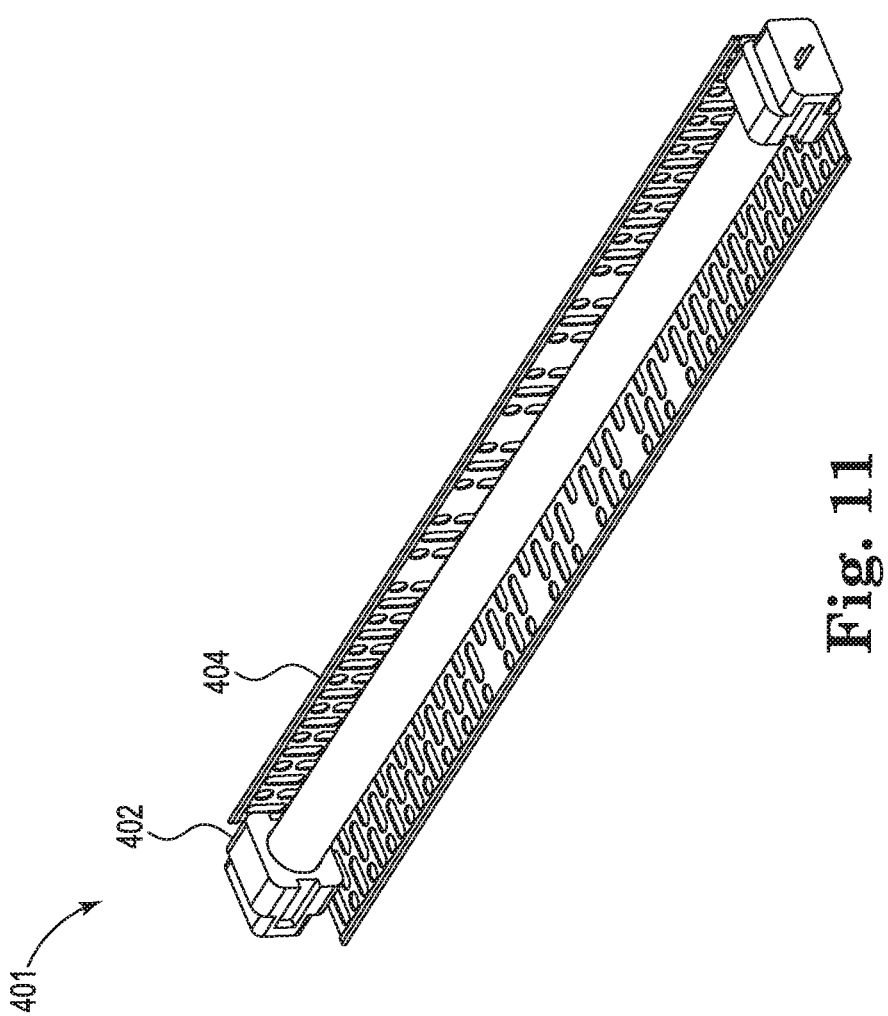
FIG. 11 shows an arrangement with lower heating device in context with lower heat distribution member of FIG. 9, according to various embodiments.

FIG. 11 shows an arrangement with a lower heating device 402 in context with lower heat distribution member 404 and illustrates a preferred relationship between the lower heating device 402 and the lower heat distribution member 404 where substantially all of the infrared radiation on two sides of the lower heating device are controlled and/or distributed according to the configuration of the lower heat distribution member. In various embodiments, the lower heating device 402 has a length and the lower heat distribution member 404 has a length, and the length of the heat distribution member 402 can be longer than the length of the lower heating device 402.

Figure 12:
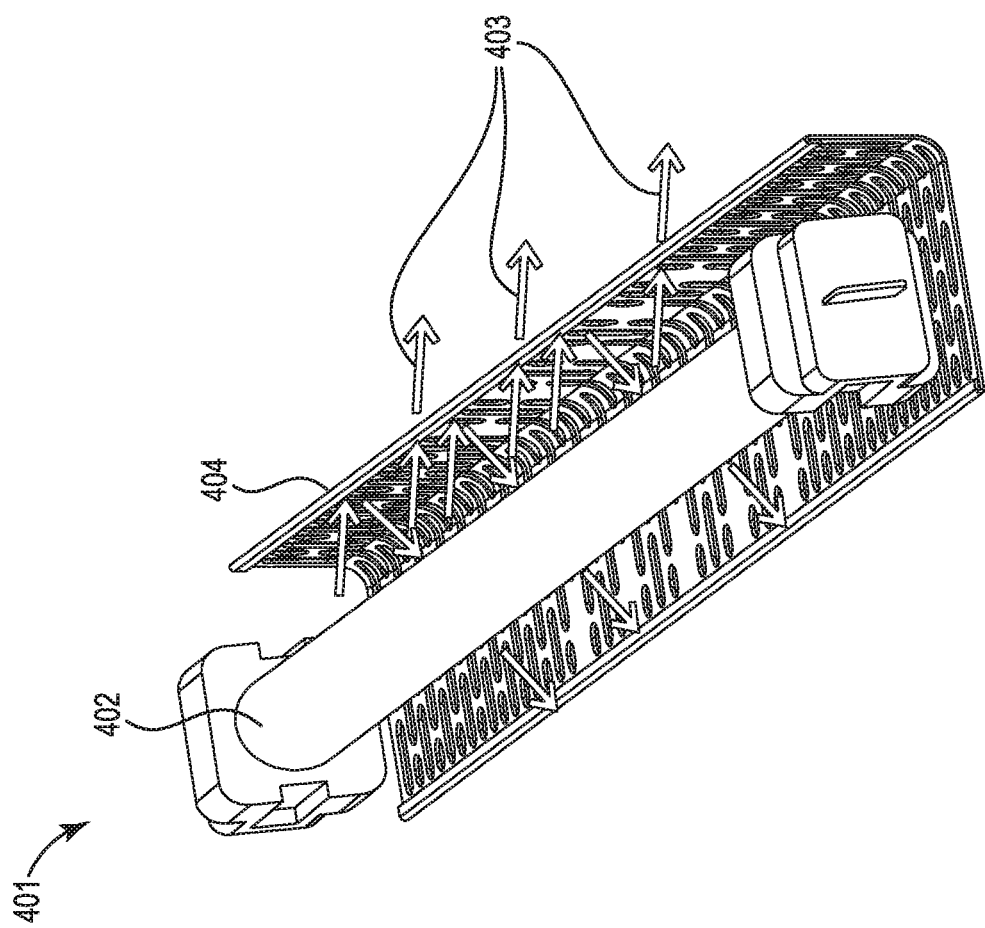
FIG. 12 shows the heat distribution member and heating device of claim 10 with arrows 403 showing illustrative infrared radiation paths and directions of propagation, according to various embodiments.

FIG. 12 shows the heat distribution member and heating device of claim 10 with arrows 403 showing illustrative infrared radiation paths and directions of propagation, according to various embodiments. As shown, heat in the form of infrared radiation 403 can pass through a pattern of various apertures in heat distribution member 404, but the infrared radiation can also be partially reflected back toward the lower heating device 402. According to the shown embodiment, the back (e.g., vertical planar portion) of the heat distribution member 404 can be designed to let some infrared radiation through and reflect the rest. In particular, the lower heat distribution member can be segmented into three approximate portions, including a first portion, a second middle portion, and a third portion. The lower heat distribution member 404 in conjunction with apertures located thereon, can be configured to reflect more infrared radiation produced by the lower heating device 402 in the second middle portion than either of the first and third portions. By reducing the infrared radiation to the back and re-routing it toward the front of the oven, the food product compartment temperature can be made more even.

According to variations of the shown embodiment, the heating device 402 can be of smaller or large size, and the heat distribution member 404 can also be sized to adjust to the size of the heating device 402. For example, a larger heat distribution member 404 can allow a heating device 402 to be spaced at a greater distance from the heat distribution member 404 while still causing all direct infrared radiation that hits a back wall of an oven containing the heating device except for infrared radiation that passes through the apertures of heat distribution member 404. In another embodiment, heating device 402 can be smaller in size, and can therefore be mounted closed to the heat distribution member 404 and still comport with the present disclosure. The heat distribution member 404 can also be located at various distance from a housing of an appliance based on size and position of the heat distribution member 404, the heating device 402, and/or an appliance's housing size and shape.

FIG. 13 is a data table 1300 including toast shade data for toast heated by a baseline toaster oven compared to toast heated by an example toaster oven utilizing an embodiment of the improved heat distribution member, as described herein. In an experiment, various toasting tests were performed using an existing toaster oven and four slides of bread, with a cooking time of four minutes. After cooking, the toast was found to be darker towards the rear and lighter toward the front. The left column (labeled "baseline") lists a series of observed toast shade test results derived from toast testing with a conventional toaster oven. The baseline (left) and inventive (right) toast shading test results are simplified as a single standard deviation for the entire tested piece of toast after toasting. For example, a piece of bread, once toasted, can have one or more toast surface that is observed (e.g., by a camera) and then the observed toast surface can form an image that can be rasterized as a bitmap, and then various pixels of the bitmap can be each assigned a "darkness" value, e.g., numerical. The various pixels can then be analyzed for a mean and a standard deviation within the toasted bread. In other embodiments, a series of more than one pieces of bread being toasted can be included in an overall bitmap toast shade dataset. As shown, the right column (labeled "with member") lists a series of toast shading standard deviation test results (to one tenth standard deviation) derived from toast testing with a toaster oven, as described herein. As can be seen, the conventional toaster oven achieved a wide measured average standard deviation of 6.1, and the improved configuration of this disclosure achieved a narrower measured average standard deviation of 4.3, nearly a 30% improvement in toasting evenness in terms of the standard deviation the toast's evenness of shade.

Figure 14:
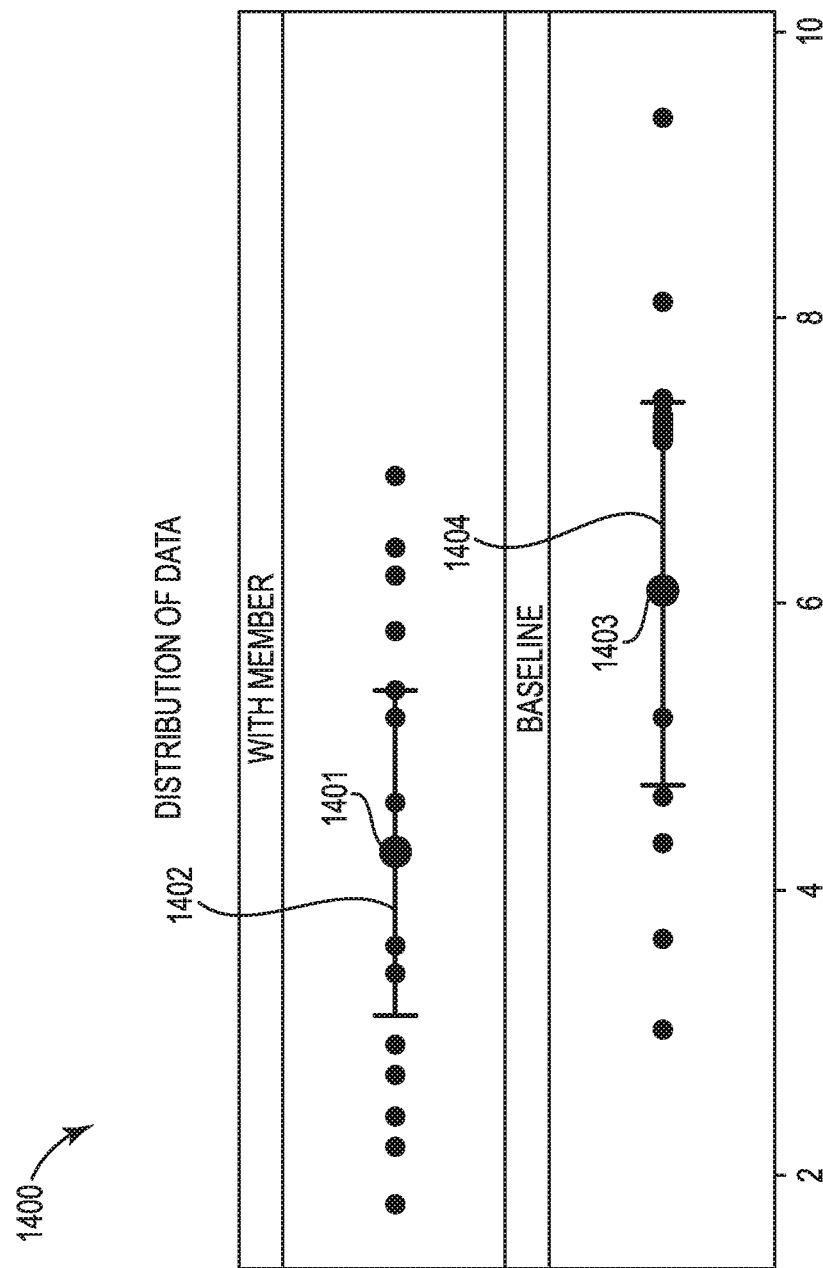
FIG. 14 provides a graphical visualization of the test results shown in FIG. 13, according to various embodiments.
Figure 15:
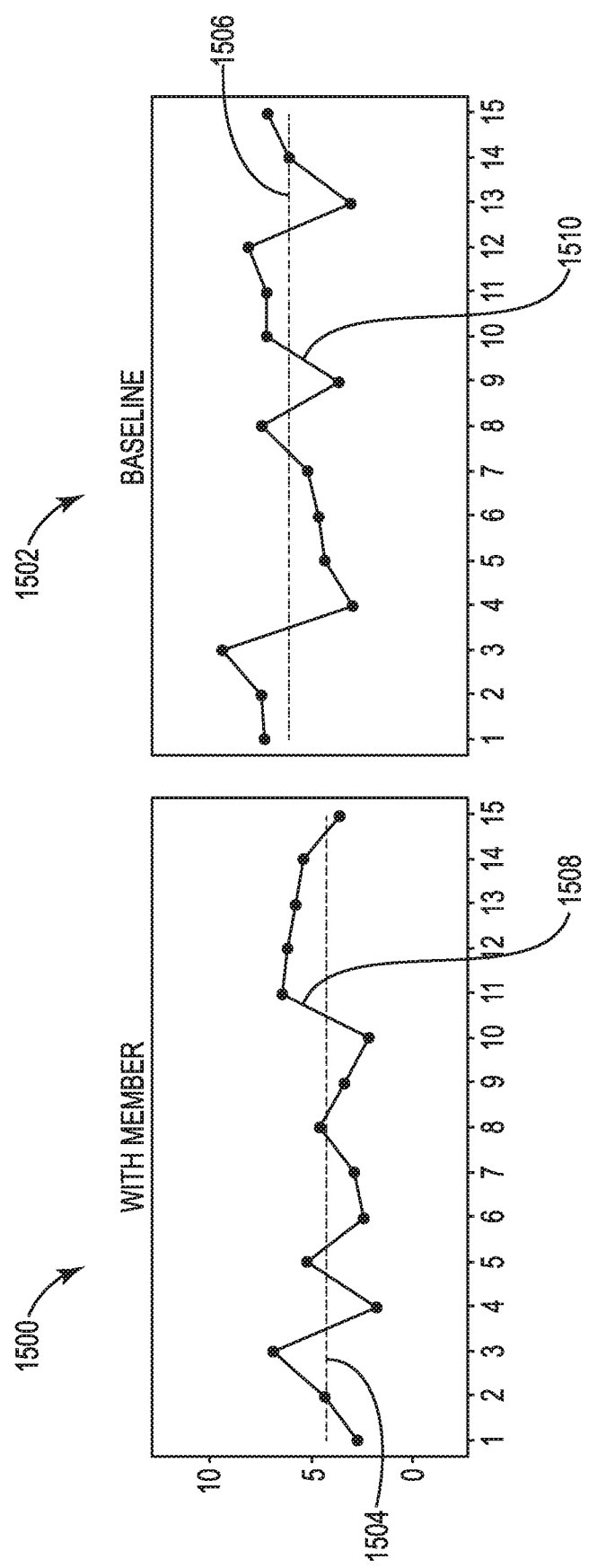
FIG. 15 graphically displays the observed standard deviations of the baseline data chart and the data chart related to a heat distribution member, as described herein.

FIG. 14 provides a graphical visualization 1400 of the toast shade standard deviation test results shown in FIG. 13. Of the measurements in the baseline column of FIG. 13, the standard deviation mean with the baseline setup is shown at 1403, and the standard deviation mean with the heat distribution member column of FIG. 13 is shown at 1401. As can be seen, the mean standard deviation 1401 for the improved heat distribution member is lower than the standard deviation mean 1404 for the baseline setup that was tested. In addition, both mean 1403 and 1401 each include a depiction of a single standard deviation from the respective mean value of 1404 and 1402, respectively. FIG. 15 graphically displays another view of the observed standard deviations of the baseline data chart 1502 and the data chart related to the heat distribution member 1500, as described herein. The baseline data chart 1502 includes a data line 1510 connecting the various standard deviation data points of FIG. 13 and a mean standard deviation 1506 is also displayed as a dashed horizontal line. The chart 1504 relating to the improvements of the present invention also includes a data line 1508 and a mean standard deviation 1504 shown as a horizontal dashed line.

According to another aspect of the present invention, and in order to further improve temperature evenness during cooking using an example toaster oven, a passive air venting system and configuration may also be employed as shown in FIGS. 16-19. The passive venting system may improve passive convection performance in the example toaster oven 100 of FIGS. 1-7. Utilizing turbulent flow (based on movement of heated and/or cool air) and other characteristics of convection in the toaster oven 100, vents, vent arrays, and/or louvers can be selectively employed in order to more evenly distribute hot air in a convection cooking process. In some embodiments, a first circulation path is located closer to a rear wall of an oven (e.g., toaster oven 100). A front (e.g., glass) door can also be employed, and can be configured to have an effect on the improved convective airflow, including a circulation path located closer to the front door than the rear wall.

Either in conduction with or separate from the embodiments describing a heat distribution element 404, an appliance housing can be configured to permit natural ventilation to achieve more even thermal distribution based on the principles of convection. Various vents and/or vent arrays may be configured to allow fluid communication through a wall (e.g., rear wall) between an interior (e.g., a food product compartment and or interior of a housing), and outside air. The vents can permit air to travel through the rear wall, which can be the same wall on which the one or more vents or vent array(s) can be located. One preferable location for passive air vents includes the rear wall of the oven (e.g., located opposite the front door), but the vents may also be located on the top, sides, or any surface of an example oven. As is well-known, heated air tends to rise, and therefore passive air vents may preferably be placed at an upper end of the food product compartment to allow built-up heat to more efficiently escape, diffuse, and/or equalize. As a front glass door of an oven (e.g., toaster oven 100) generally is less thermally insulated than other sides of the oven, convection can also be affected by the position of the front glass door, including a second circulation path generally closer to the front door than the rear wall. Various air vents, as used herein, can be configured to permit fluid communication between a food product compartment of an oven and the outside of the oven's housing, for example, through a rear wall.

Figure 16:
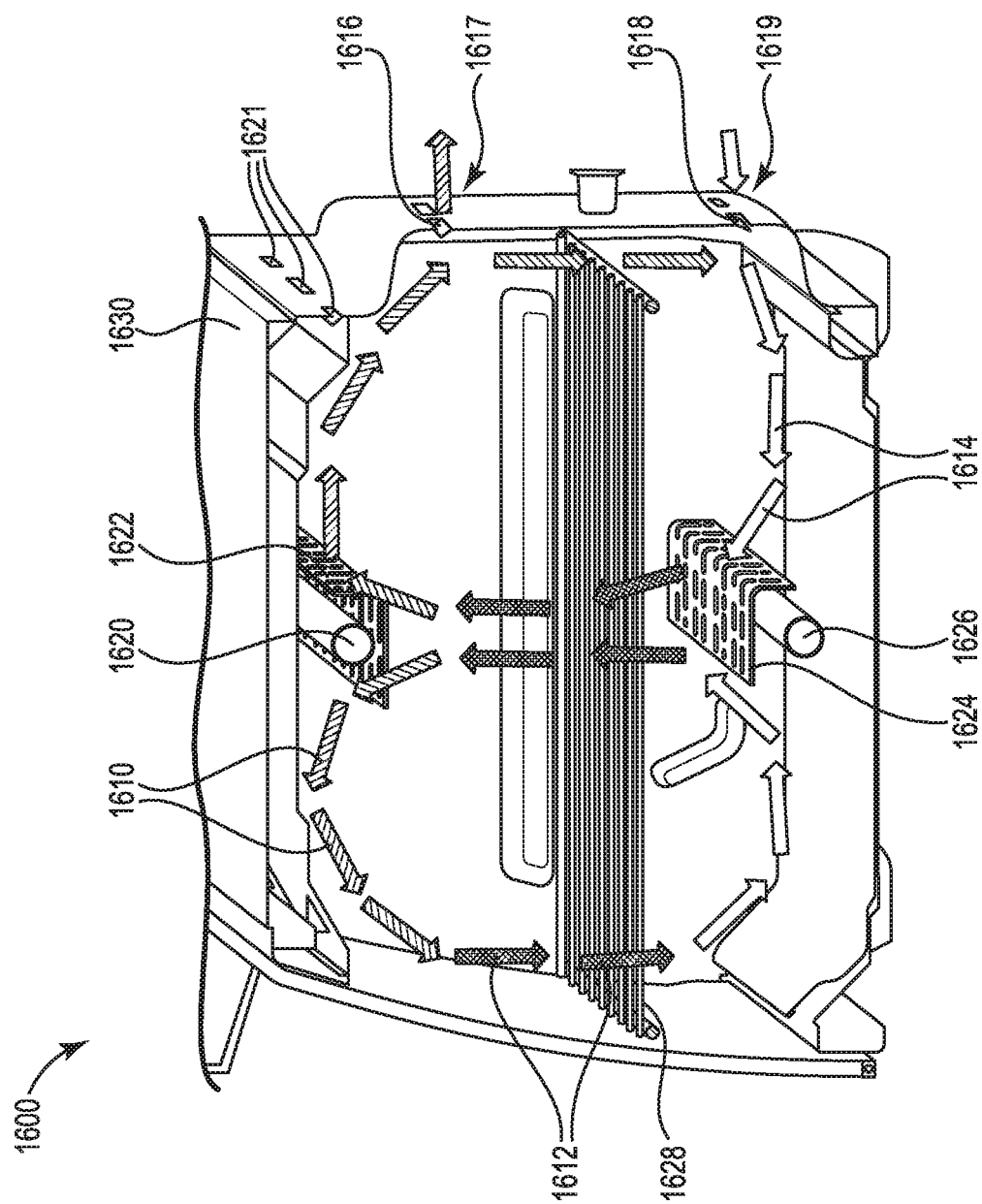
FIG. 16 shows a side view of a toaster oven equipped with upper and lower vents on the rear wall of an oven, according to various embodiments.

In particular, FIG. 16 shows a side view of a toaster oven 1600 equipped with upper 1616 and lower 1618 vents on the rear wall 1632 of the oven 1600. Oven 1600 can be similar to oven 100, according to various embodiments. Also shown is an upper heating device 1620, an upper heat distribution member 1622, a lower heating device 1626, and a lower heat distribution member 1624. Also shown is a grate 1628 for a food product (e.g., bread) to be cooked, heated, toasted, etc. (not shown). The positioning of upper vents 1616 and lower vents 1618 preferably causes cooler air to naturally enter through lower vents 1618. Once hot air has reached the oven's 1600 interior (food product compartment), hot air while rising may seek to exit the oven 1600, causing upper vents 1616 to serve as a heat exhaust. This preferably creates a (one or more) natural passive convection heat path with cool outside air entering at the lower vents 1618 and circulating through the middle of the oven 1600, with some heat then escaping (or exiting) out the upper vents 1616, according to various embodiments. Note that a distinct set of thermostat compartment vents 1621 are also shown, but such vents 1621 do not include a passage to the oven's 1600 interior.

As shown, cool outside air (shown as arrows 1614) can naturally get convectively pulled or drawn into the lower vents 1618 (as shown, shaped as short, wide slots) of the oven 1600. The (one or more) lower vents 1618 may together constitute a lower air vent array 1619. When the cool air 1614 moves toward the front of the oven (the left side, as shown) the cool air 1614 reaches the lower heating device 1624 (if present) where the cool air 1614 heats up and rises (arrows show air in transition from cool to hot or hot to cool as 1612), pushing the air above it towards the front or the rear of the oven 1600 or interior food product compartment, as described herein. As shown, when the heated air 1612 reaches the top, it preferably is hot air (shown as arrows 1610). As some hot air 1610 gets pushed to the front or the rear of the oven 1600, some of the hot air 1610 escapes/exits the oven 1600 out the (one or more) upper vents 1616, by taking a path of least resistance or through random motion. The upper vents 1616 may together constitute an upper air vent array 1617. Although some hot air exits oven 1600 through the upper air vent array 1617 (or through a front glass door, as described herein), some hot air may circulate and naturally cool after rising. Therefore, any remaining hot air 1610 preferably cools and gets re-circulated as cool air 1614. By letting the cool outside air 1614 in, it induces the airflow path shown in FIG. 16.

In some embodiments, the airflow path shown in FIG. 16 includes a first circulation path generally closer to the rear wall (shown at right), and a second circulation path closer to the front door (shown at left). Although the front door at left may not include vents configured for fluid communication between a food product compartment of oven 1600 and outside air, as described herein, a front door may be constructed of glass or other material that includes higher thermal transmission characteristics than other parts/sides of oven 1600. As a result, a second circulation path generally near the front door can be similar to and related to a first circulation path closer to the rear wall, and thermal transmission can preferably still occur through the front door like thermal transmission occurs through the various described vents. According to another embodiment, the lower heating device 1626 (e.g., heating assembly) can positioned at a height between a height of to first lower air vent 1618 and a height of a second upper air vent 1616.

Described upper and lower vents 1616/1618 may be included in a respective vent array 1617/1619, which can include any number of vents (approximately between one and ten vents, or more), but preferably two vents per respective vent array, as shown. The various vents may be of varying or uniform size, and may be placed at various heights, but preferably at the approximate height shown herein. As shown, the upper vents 1616 are located near the top of the oven 1600 housing, and the lower vents 1618 are located near the bottom of the oven 1600 housing. In one embodiment, cool outside air 1614 can be preferably introduced to the food product compartment by the lower vents 1618 in such a way as to cool typically hotter areas within the oven 1600 during various stages of the cooking or heating process. The oven 1600 may achieve a steady state air temperature as a pre-condition prior to the cool air 1614 entering the interior food product compartment, or otherwise.

According to various embodiments, as shown, convective energy is preferably redistributed to where is it more desirable, mitigating overly hot areas. Preferably, the described upper and lower vents 1616/1618 are located at the rear wall of the interior food product compartment of the oven 1600 for various reasons, such as to allow introduction of cool outside air 1614 to a relatively hot area of the oven 1600, but the vents may be located elsewhere, according to other embodiments. The vents may be located at or near the rear wall as that may typically be the hottest area of the oven 1600 when in heating operation. The lower vents 1618 may passively introduce turbulent airflow of outside air interacting with the heated air within the example toaster oven.

As described below in FIGS. 20-22, a roughly 10% improvement in evenness of convection cooking has been observed in testing of the inventive venting configuration described, above. Preferably, upper vents 1616 are located near the top of the oven, and the lower vents 1618 are located near the bottom of the oven, as shown. The various vents may be located on the rear wall or back of the oven as there may be a single exterior oven wall layer at this location. In addition, the upper vents 1616 can be located above a food grate (not shown), and the lower vents 1618 can be located below the same food grate in the oven 1600. To get the proper flow, lower vents 1618 allow cool outside air to flow to the upper heating device 1620 so it can heat the air and cause it to rise. Thus, the lower vents 1618 are preferably located nearer a lower part of oven 1600.

Figure 17:
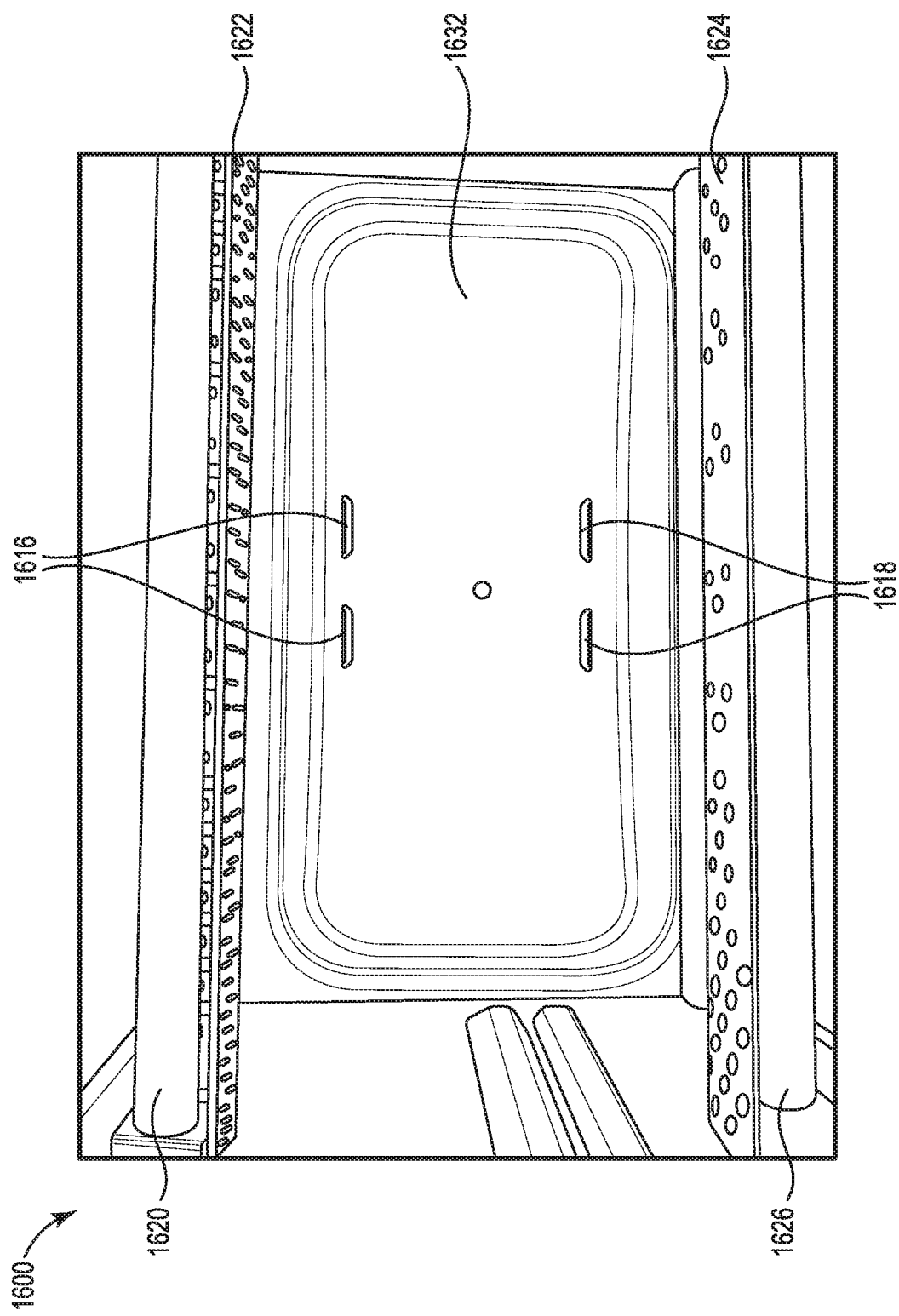
FIG. 17 is an interior view of the oven of FIG. 16 highlighting upper and lower vents, according to various embodiments.
Figure 18:
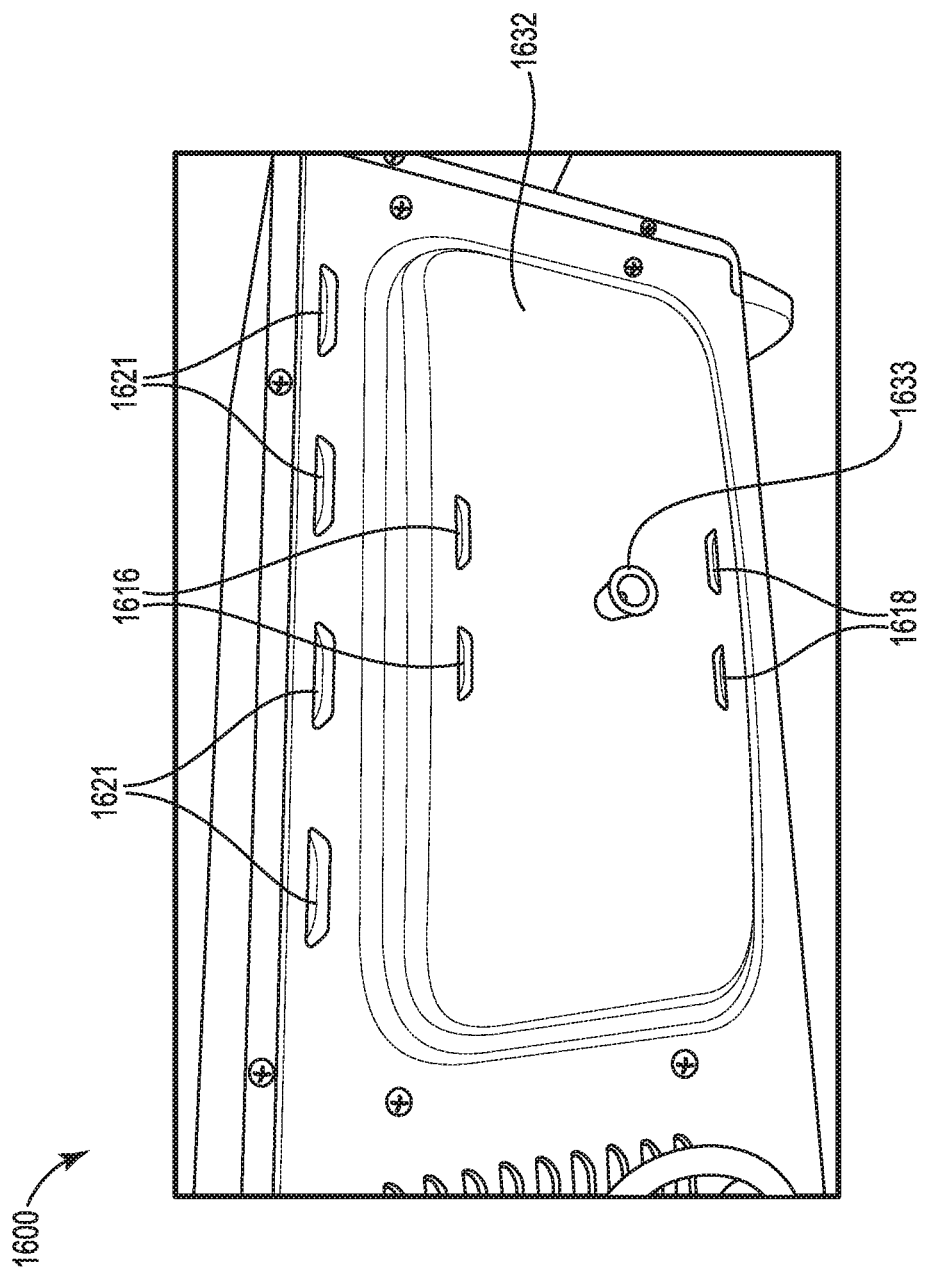
FIG. 18 is an exterior rear view of the oven of FIG. 11 highlighting upper and lower convection vents, according to various embodiments.

FIG. 17 is an interior view of the oven 1600 of FIG. 16 highlighting upper and lower vents 1616/1618, according to various embodiments. Also shown is a food compartment protrusion 1632 of the rear wall of the food product compartment having a rounded-corner, rectangular shape. FIG. 18 is an exterior rear view of the oven 1600 of FIG. 11 highlighting upper and lower convection vents, according to various embodiments. Also shown is an exterior view of the protrusion 1632 of the rear wall of the food product compartment having a rounded-corner, rectangular shape. A standoff 1633 is shown mounted to the outside of the rear oven wall 1632, with the standoff 1633 being preferably configured to adjust placement of the oven with respect to an external wall (e.g., of a kitchen) in order to maintain convective airflow when oven 1600 is placed against the external wall.

As shown, upper vents 1616 and lower vents 1618 are preferably located near the horizontal center of the width of oven 1600. Although upper vents 1618 and lower vents 1618 are each shown as including two vents each, other embodiments include only a second upper vent 1618 and/or a single upper vent 1618. Alternatively, upper vents 1616 can include three or more vents, and lower vents 1618 can include three or more vents, or any combination of the preceding. More preferably, each of the upper vents 1618 and the lower vents 1618 are located in a horizontal center third of the width of the oven 1600. In preferable embodiments, upper vents 1616 are located vertically proximate a top of a food product compartment of oven 1600, and the lower vents are located vertically proximate a bottom of the food product compartment of oven 1600. In some embodiments, a distance that separates the upper vents 1616 from the top of the food product compartment of oven 1600 can be substantially similar to a distance that separates the upper heating device 1620 from the upper heat distribution member 1622. In a similar fashion, a distance that separates the lower vents 1618 from the bottom of the food product compartment of oven 1600 can be substantially similar to a distance that separates upper heating device 1620 from the upper heat distribution member 1620, according to various embodiments. Many other variations in spacing and placement of the various components are contemplated herein.

For the sake of describing example vent locations, the rear oven wall 1632 can be divided into regions. For example, the rear oven wall 1632 can include a plurality of regions, where the sections are laid out in a three-by-three grid. According to various embodiments, the sections include an upper third, a vertical middle third, and a lower third, and the sections also include a left third, a horizontal middle third, and a right third (as viewed from within the oven 1600, as shown). According to one embodiment, the first and second air vents are both located in a section defined as being within the vertical middle third and the horizontal middle third. The vents can alternatively be located is separate or other sections, as contemplated herein. In some embodiments, the various sections can be defined as equal thirds of a horizontal or vertical dimension of the rear oven wall 1632 of the oven 1600.

Figure 19:
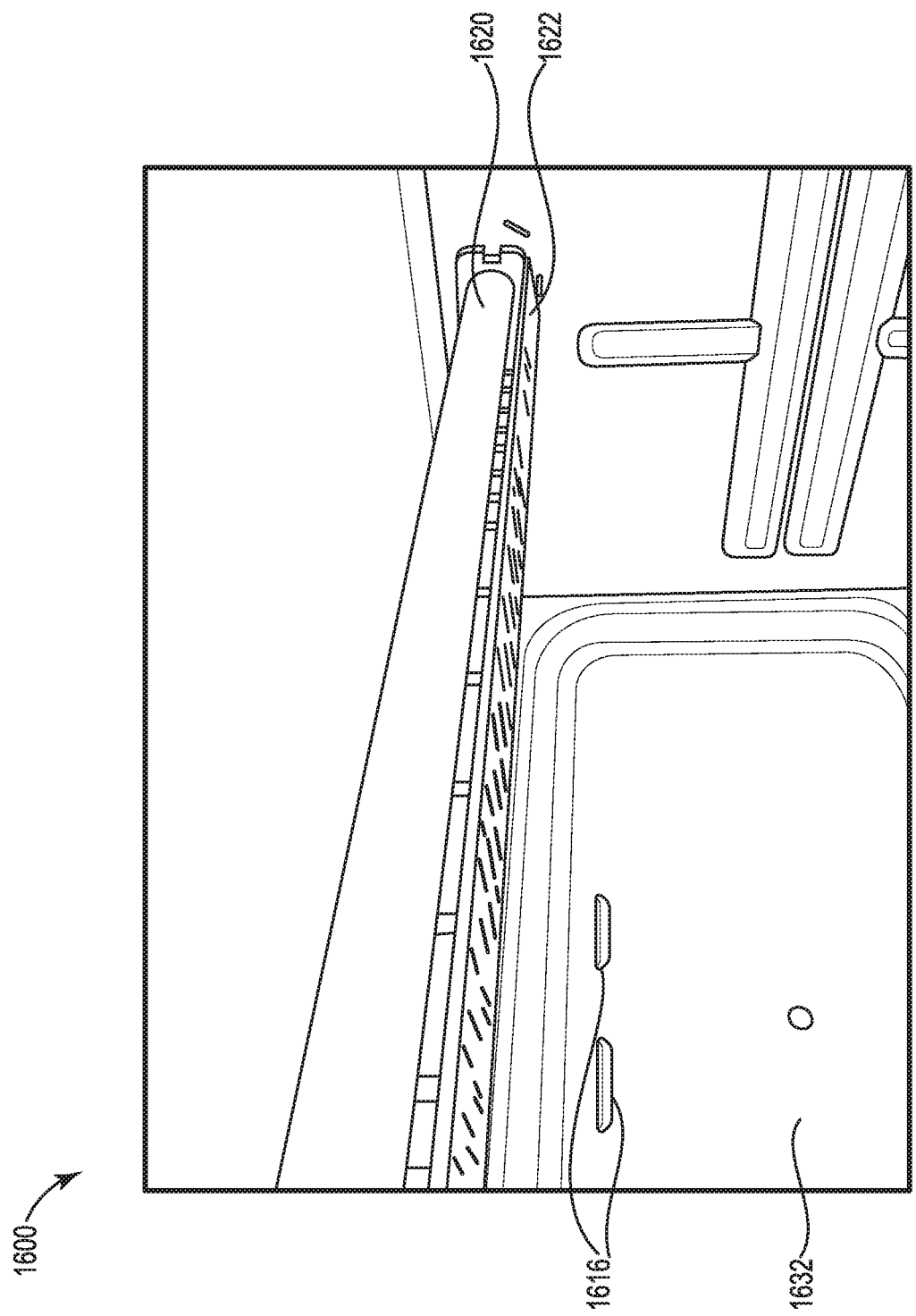
FIG. 19 is an interior view of the oven, as described herein, which shows the upper heat distribution member from the front of the oven, according to various embodiments.

It is also contemplated that the various disclosed vents can be placed in other suitable venting locations of the oven 1600 rear wall, including to the side, or moved up or down. In some cases, performance may be relatively more sensitive and more affected by horizontal movement of vent placement than vertical movement. Shown at FIG. 16 is the set of thermostat compartment ventilation vents 1621, which preferably do not substantially affect the convection function of upper vents 1616 and lower vents 1618. In various embodiments, thermostat compartment ventilation vents 1621 can be similar to vents 230 shown in FIG. 2. FIG. 19 is an interior view of the oven 1600, as described herein, which shows the upper heat distribution member 1622 from the front of the oven 1600, according to various embodiments. Also shown are the upper vents 1616, as described herein.

FIG. 20 is a data table 2000 including air temp evenness for an oven (e.g., oven 1600 or 100) equipped with upper and lower vents, as described herein. The left column (labeled "old design") represents baseline data of a toaster oven without rear vents, as described herein. The right column (labeled "with vents") represents results where the upper and lower vents (e.g., four vents total) are opened prior to testing, as described with respect to FIGS. 16-19. A grid of 12 thermocouples were positioned (e.g., as a three-by-four grid) on or near a grate for receiving food to be cooked, and were utilized to measure air temperature at various points in the food product compartment of an oven (e.g., oven 1600) in order to compare evenness of the various regions within the food product compartment. For the testing the oven was configured to reach approximately 400° F. (approximately 204.4° C.). The standard deviation of the readings of the 12 thermocouples are represented by each row in the data table 2000, and the experiment was repeated for five ovens, three tests each. The readings of the various thermocouples were then observed, and the standard deviation of the 12 measurements of the 12 thermocouples was used to calculate an overall air evenness rating. In the tests performed, and to mimic a conventional toaster oven, the upper and lower vents were closed for baseline testing, and the mean standard deviation measured to be 5.8. With the upper and lower vents open, as described herein, the measured mean standard deviation was 5.2, roughly a 10% improvement in air temperature evenness throughout the food product compartment.

Figure 21:
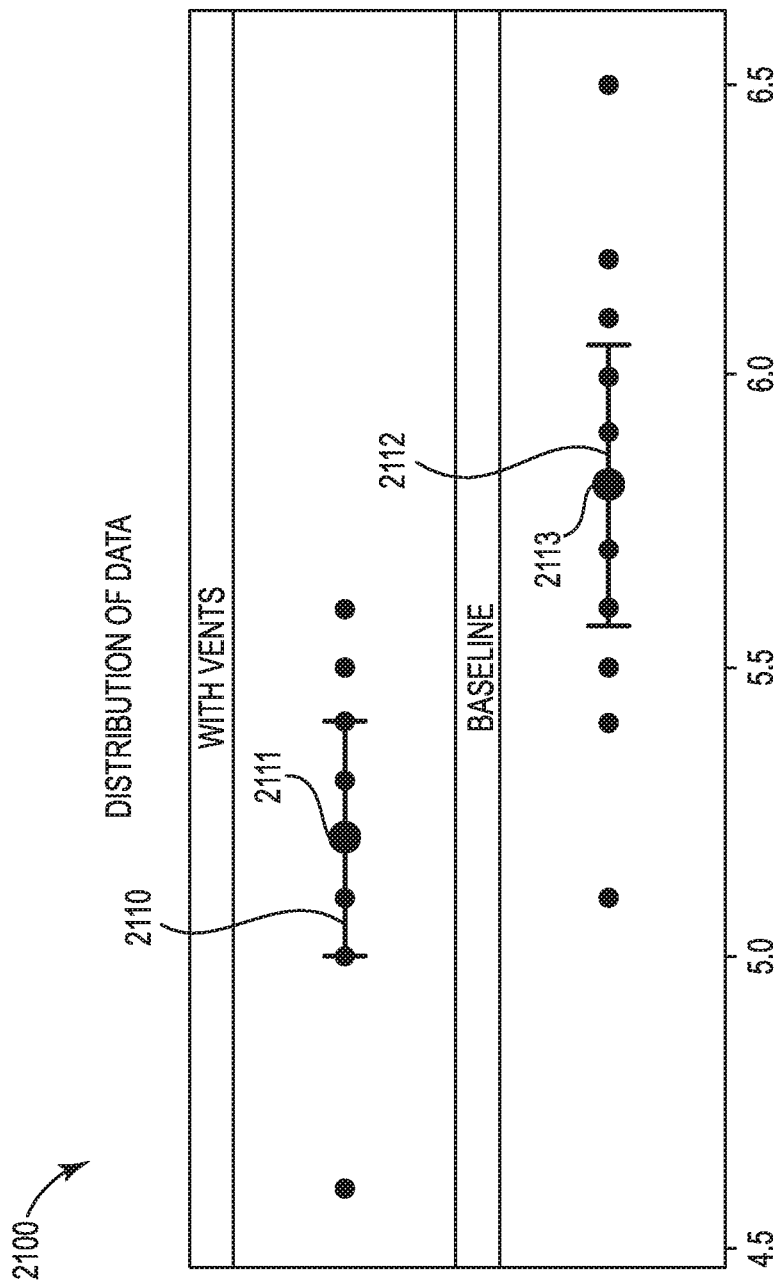
FIG. 21 displays a distribution of data graphically, including average standard deviations of temperature based on the serious of thermocouples used to measure the heat distribution data in the data table.
Figure 22:
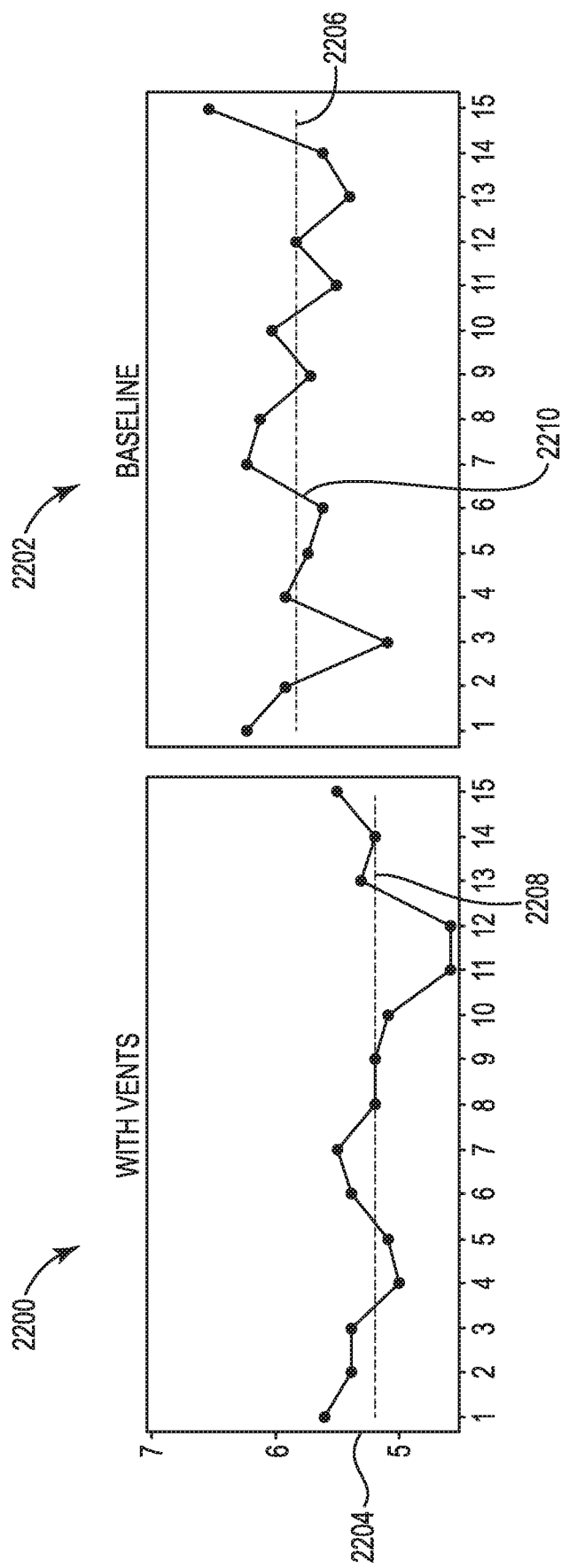
FIG. 22 displays the data of data table as a chart, according to various embodiments.

FIG. 21 displays a distribution of data 2100 graphically, including average standard deviations of temperature based on the series of test runs used during the heat distribution measurement of ovens in various configuration, shown in data table 2000. A baseline heat distribution mean standard deviation measurement is displayed at 2113, along with bars showing an additional standard deviation 2112 plus or minus the calculated average using the existing oven configuration. A mean heat distribution standard deviation 2111 was also calculated based on the upper 1616 and lower 1618 vents, along with a plus or minus one standard deviation therefrom 2110. FIG. 22 displays the standard deviation data of data table 2000 in yet another way. Baseline chart 2200 includes connected data points 2210 and the mean standard deviation 2206 (which is preferably the same as 2113) is also displayed as a horizontal, dashed line. In a similar fashion vent chart 2200 displays the standard deviation data according to the improved vent configuration described herein, including connected data points 2208, and the mean standard deviation of the inventive configuration test data 2204 (which is preferably the same as 2111), shown as a horizontal, dashed line. Note that 2204 is substantially lower than 2206, according to the present data, showing the effectiveness of the inventive vent configuration of FIGS. 16-19.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heating appliance, comprising:
   a housing defining a food product compartment having at least a front door and a rear wall opposite the front door;
   a rack operatively positionable to the housing to support a food product within the food product compartment;
   a heating device operatively connected with the housing and disposed within the food product compartment, the heating device positioned to heat air within the food product compartment thus causing the heated air to rise within the food product compartment;
   a first air vent located at a lower portion of the rear wall of the housing, the first air vent permitting fluid communication between the food compartment and an outside of the housing through the rear wall, so that when the heating device is energized for causing the heated air to rise, additional air is drawn from the outside of the housing through the first air vent into the food product compartment toward the heating device; and
   a second air vent located at an upper portion of the rear wall of the housing, the second air vent permitting fluid communication between the food compartment and the outside of the housing through the rear wall, so that when the heating device is energized for causing the heated air to rise, the heated air is caused to circulate within the food compartment with at least some of the air exiting the food product compartment through the second air vent.

2. The heating appliance of claim 1, wherein the heating device is positioned at a height between a height of the first air vent and a height of the second air vent.

3. The heating appliance of claim 1, wherein the first air vent includes a first air vent array having two or more air vents, and wherein the second air vent includes a second air vent array having two or more air vents.

4. The heating appliance of claim 1, wherein the rear wall includes a plurality of sections,
   wherein the first and second air vents are both located in a middle section as between side edges of the rear wall with the first vent located in a bottom section as between top and bottom edges of the rear wall, and with the second vent located in a top section as between the top and bottom edges of the rear wall.

5. A method of heating air within an oven, comprising;
   generating heat using a heating device located within a food product compartment of the oven;
   heating the air using the heat generated by the heating device, causing the heated air to rise within the food product compartment;
   drawing in outside air at a first air vent located on a lower portion of a rear wall of a housing of the oven, the first air vent permitting fluid communication through the rear wall; and
   circulating the rising, heated air in a first circulation path with at least some of the heated air exiting the oven housing through a second air vent located on an upper portion of the rear wall of the oven housing, the second air vent permitting fluid communication through the rear wall.

6. The method of claim 5, further comprising:
defining the food product compartment of oven with a front door located opposite the rear wall.

7. The method of claim 6, wherein the circulating causes the first circulation path to be generally closer to the rear wall than the front door.

8. The method of claim 6, wherein the circulating further causes the heated air to circulate in a second circulation path that is generally closer to the front door than the rear wall.

9. The method of claim 5, wherein the heat generated by the heating device is convective heat.

\* \* \* \* \*